US009662565B1

(12) United States Patent
Riordan

(10) Patent No.: US 9,662,565 B1
(45) Date of Patent: May 30, 2017

(54) SIMULATION OF, AND PROCESSES THAT EMPLOY, CHARACTER WITH HYPER-FAST ABILITY

(71) Applicant: Lee Riordan, New York, NY (US)

(72) Inventor: Lee Riordan, New York, NY (US)

( * ) Notice: Subject to any disclaimer, the term of this patent is extended or adjusted under 35 U.S.C. 154(b) by 433 days.

(21) Appl. No.: 14/147,254

(22) Filed: Jan. 3, 2014

Related U.S. Application Data

(63) Continuation of application No. 12/425,846, filed on Apr. 17, 2009, now abandoned.

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *A63F 13/20* | (2014.01) | |
| *A63F 13/40* | (2014.01) | |
| *A63F 13/69* | (2014.01) | |
| *A63F 13/63* | (2014.01) | |
| *A63F 13/822* | (2014.01) | |
| *A63F 13/58* | (2014.01) | |

(52) U.S. Cl.
CPC .............. *A63F 13/06* (2013.01); *A63F 13/20* (2014.09); *A63F 13/40* (2014.09); *A63F 13/58* (2014.09); *A63F 13/63* (2014.09); *A63F 13/69* (2014.09); *A63F 13/822* (2014.09); *A63F 2300/609* (2013.01)

(58) Field of Classification Search
CPC .......... A63F 13/06; A63F 13/10; A63F 13/20; A63F 13/40; A63F 13/58; A63F 13/63; A63F 13/69; A63F 13/822; A63F 2300/609
See application file for complete search history.

(56) References Cited

U.S. PATENT DOCUMENTS

| 6,718,517 B1 | 4/2004 | Davis |
| 2005/0053365 A1 | 3/2005 | Adams et al. |

OTHER PUBLICATIONS

World of Warcraft Manual (copyright 2004 by Blizzard Entertainment).*
Master of Orion 2 Manual (Released on Oct. 31, 1996).*
(Continued)

*Primary Examiner* — Milap Shah
*Assistant Examiner* — Jason Pinheiro
(74) *Attorney, Agent, or Firm* — Banner & Witcoff, Ltd.

(57) ABSTRACT

Methods, systems, and media are described herein whereby a character having one or more hyper-fast abilities is depicted to an audience, e.g., via a video game, book, movie, TV show, video, Internet game, casual game, mobile game, short story, novel, or other medium, for education, training, and/or entertainment purposes. The hyper-fast abilities provide super-fast physical and neurological response times and abilities to the character, e.g., running fast, visual detection of minutiae, hyper-fast learning abilities, etc. The character may use the hyper-fast abilities to complete a sequence of challenges and a chief challenge, either alone or in competition with one or more other player characters. In multi-player modes, characters may insert obstacles in the path of other characters, thereby slowing the other characters down and increasing his or her own chances of winning the game.

19 Claims, 8 Drawing Sheets

(56) References Cited

OTHER PUBLICATIONS

New Chaos Marauder video (available online at www.youtube.com/watch?v=-SF4dSRlhyg as of Oct. 11, 2007).*

Master of Orion II Wikipedia Entry (retreived Jul. 28, 2012 available at http://en.wikipedia.org/wiki/Master_of_Orion_II:_Battle_at_Antares).

StrategyWiki Article Master of Orion 11/Race Design Option (retrieved Jul. 28, 2012 availalble at http://strategywiki.org/wiki/Master_of_Orion_II/Race_design_options).

StrategyWiki Article Master of Orion 11/Espionage Wars (retrieved Jul. 28, 2012 available at http://strategywiki.org/wiki/Master_of_Orion 11/Espionage wars).

New Chaos Marauder video (available online at www.youtube.com/watch?v=-SF4dSRihyg as of Oct. 11, 2007).

IGN walkthrough: Rogues' Guide to how to get Poisons (Alliance Side) available online at http://faqs.ign.com/articles/607/607182p1.html as of Apr. 25, 2005.

Allakhazam.com wiki: Rogue abilities (WoW) Available online at httop://wow.allakhazam.com/wiki/Rogue_abilities_(WoW) as of Jun. 7, 2008.

Language—WoWwiki, the Warcraft wiki avalable online at http://www.wowwiki.com/Language as of Oct. 10, 2007.

Christopher Lawton, "Video Sites Entice Users to Stay and Play", Technology, Feb. 6, 2009, <http:/fonline.wsj.com/article/SB123370933597245913.html>.

Siri Schubert, "A Look Tells All", Scientific American Mind, Oct./Nov. 2006, pp. 26-31.

Oliver Sacks, "Speed", The New Yorker magazine, Aug. 23, 2004, pp. 60-69.

Malcolm Gladwell, "The Naked Face", The New Yorker magazine, Aug. 5, 2002, pp. 38-49.

"The Adventures of Indiana Jones, Role-Playing Game Rules Booklet", TSR, Inc.

Paul Ekman, "emotions revealed, Recognizing Faces and Feelings to Improve Communication and Emotional Life", Second Holt Paperbacks Edition 2007, Chapter 1.

Paul Ekman and Erika L. Rosenberg, "What the Face Reveals, Basic and Applied Studies of Spontaneous Expression Using the Facial Action Coding System (FACS)", Second Edition, Oxford University Press, 2005, Chapter 1.

Sep. 15, 2011 Non-Final Office Action issued in U.S. Appl. No. 12/425,846.

Feb. 24, 2012 Final Office Action issued in U.S. Appl. No. 12/425,846.

Oct. 22, 2012 Non-Final Office Action issued in U.S. Appl. No. 12/425,846.

Jul. 5, 2013 Final Office Action issued in U.S. Appl. No. 12/425,846.

* cited by examiner

SIMULATION OF, AND PROCESSES THAT EMPLOY, CHARACTER WITH HYPER-FAST ABILITY

CROSS-REFERENCE TO RELATED APPLICATIONS

This application is a continuation of application Ser. No. 12/425,846, filed Apr. 17, 2009, by and having the same title.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computer simulation, entertainment, and user interactivity. More specifically, the invention provides a computerized simulation system and attendant methods for simulating a sentient being having hyper-fast abilities, and providing methods of user interaction with the simulated character. Other aspects of the invention provide for entertainment and training media describing and/or depicting the simulated character.

BACKGROUND OF THE INVENTION

Entertainment media and ideas are constantly changing and evolving. Compared to the film industry, which is over 100 years old, the video game industry has grown from birth to being larger than North American movie ticket box office sales in about thirty years. Within the past decade, massively multiplayer online games (MMOGs) and virtual worlds have become more prominent, providing in a video game a variety of interactive simulated worlds where users can interact based on a dedicated theme (e.g., Club Penguin®), to achieve common goals (e.g., World of Warcraft®), or to create an alternate reality (e.g., Second Life®).

Typically, once a user completes a certain game or objective, the user does not replay the game using the same settings. When games were first introduced, the game might have only had one setting (e.g., one difficulty level) and, as a result, the user would discard or sell the game once the user completed the game. Game developers began introducing game variations in hopes of maintaining user interest for longer periods of time, e.g., using various difficulty levels, including unlockable content based on the user completing certain objectives, establishing game achievements to obtain gamer points in an online game community, and providing additional game content at some additional point in time after the game's original release, which can be incorporated into the original game. Additional game content is sometimes given away or sold as add-on packs, or may be downloaded over the Internet or other network connection.

As a result of the constantly evolving entertainment industry, the consuming public has come to expect a never-ending stream of new entertainment ideas and concepts, as well as new forms of entertainment media, and companies can proliferate by introducing such new games and forms of entertainment.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, aspects of the present invention are directed to entertainment media depicting a character having one or more hyper-fast abilities based on a hyper-fast brain, neurological system, and/or neuromuscular system, and the attendant vulnerabilities of such a character and the obstacles that such a character must overcome to achieve his or her goals and/or objectives.

For example, a video game product might include one or more computer readable media storing computer executable instructions that, when executed, cause a data processing device to perform a game play method of simulating on a video display device a character having one or more hyper-fast abilities by determining a plurality of challenges for a player of a video game, wherein one challenge of the plurality of challenges is a chief challenge, and the remaining challenges of the plurality of challenges are sub-challenges; determining an order for the sub-challenges to create a game course; graphically rendering a virtual environment in which a player-controlled character interacts with the environment using a game controller, wherein the player-controlled character has a plurality of simulated hyper-fast abilities within the virtual environment; presenting one of the plurality of challenges within the virtual environment; receiving first user input via the game controller indicating a user-desired hyper-fast ability to be performed by the character; determining, based on the user-desired hyper-fast ability, whether the player-controlled character overcomes the one of the plurality of challenges; and graphically rendering the character performing the user-desired one of the plurality of hyper-fast abilities to depict the determined success or failure of whether the character overcomes the one of the plurality of challenges.

Variations of the invention might include identifying a challenge from a database of game challenges stored in a memory; and determining whether the character beats the challenge based on the corresponding one of the plurality of hyper-fast abilities. Another variation might include initiating a hyper-fast ability mode corresponding to one of the hyper-fast abilities, wherein determining whether the character beats the challenge is further based on second user input received while in the hyper-fast ability mode. Yet another variation of the invention might include, prior to receiving the first user input, receiving second user input selecting one or more hyper-fast abilities, wherein identifying the challenge comprises selecting a challenge in which one of the selected hyper-fast abilities is required to overcome the challenge. Challenges may alternatively be selected randomly, or may be selected based on user defined enhancements and/or vulnerabilities of the player's character. Still other aspects of the invention might include the hyper-fast abilities including one or more of a hyper-fast brain processing ability, a hyper-fast neurological ability, and/or a hyper-fast neuromuscular ability. Each ability may occur naturally in the character or may result from a genetic mutation or flaw.

Other forms of entertainment media in which the character may be depicted include motion pictures, television, Internet video, or any other audio and/or video media. The character may also be incorporated into books, texts, literature, or other written stories, wherein the character is narratively and/or illustratively depicted confronting challenges based on the hyper-fast abilities, subject to inherent vulnerabilities created by the hyper-fast abilities.

For example, another aspect of the invention might include a method that depicts in a tangible medium of expression a fictional character having one or more hyper-fast abilities; derives one or more capabilities from the character's hyper-fast abilities, and identifies the one or more capabilities in the tangible medium of expression; depicts in the tangible medium the fictional character utilizing the one or more capabilities to overcome a plurality of challenges; and depicts the fictional character overcoming a primary challenge defined by a story plot in which the fictional character is involved.

In various embodiments of the invention, the tangible medium of expression may include digital storage media storing an audiovisual or literary work.

According to another aspect of the invention, a player of a video game may purchase or obtain by trade one or more enhancements for a character controlled by the player. For example, the video game may provide a first allotment of points to a first player of a video game on a data processing device; while points remain in the first allotment of points, the video game receives first user inputs from the first player, where the first user inputs each select a player enhancement, and wherein each player enhancement has an associated point value subtracted from the first allotment of points.

The video game may optionally provide a second allotment of points to the first player of the video game for use in selecting one or more vulnerabilities, and receive second user inputs from the first player, where the second user inputs each select a vulnerability, where each vulnerability has an associated point value, and where the first player selects vulnerabilities at least until the total points associated with each vulnerability exceeds the second allotment of points.

These and other aspects are described in more detail below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the invention provide new methods and systems for entertaining and/or training audiences in video games, books, film, TV, and other media based on one or more fictional characters having one or more hyper-fast abilities. When the character is confronted by adversity or an obstacle, the character may overcome adversity or overcome the obstacle using abilities deriving from his/her hyper-fast abilities. The character may be depicted in any media, now known or later developed, to convey stories based on the capabilities derived from the character's hyper-fast abilities, where the stories incorporate the adversity or obstacle, and enable plots that are of interest to readers, viewers, listeners, garners, and other members of the media consuming public, as further described below.

As used herein, a character having a hyper-fast brain and/or hyper-fast abilities may be referred to as an "agent". The term "hyper-fast ability" as used herein may refer to supernatural or superfast brain processing abilities, cognition, neurological system processing and response, and/or neuromuscular system, thereby allowing a character to process and react to information and events at a speed greatly increased beyond that of a normal human's cognitive and physiological abilities. As used herein, neurological abilities may also include cognitive abilities. An agent not only might be able to think and process information in a superfast manner, but may also or alternatively be able to physically react to events in a superfast manner. The agent (or agents, armies, tribes, groups, etc.) may be a human character whose genetics may or may not have been synthetically altered or naturally mutated, or may be a non-human character with natural or unnatural hyper-fast abilities as described herein. Different groups or adversaries may have the same or differing abilities.

Figure 1:
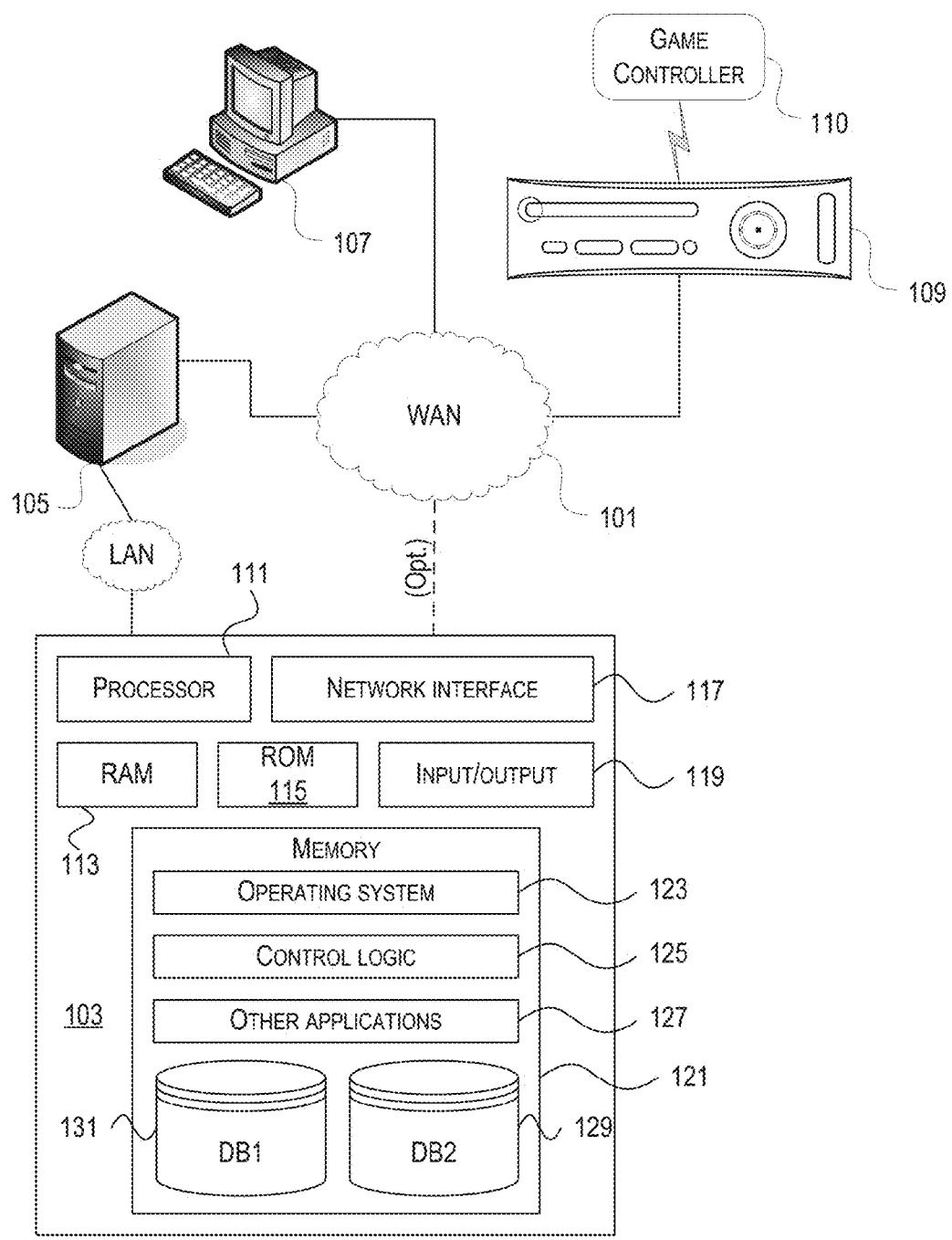
FIG. 1 illustrates a system architecture for performing one or more illustrative aspects of the invention.

FIG. 1 illustrates one example of a network architecture and data processing device that may be used to implement one or more illustrative aspects of the invention. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), gaming networks, and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data-attributable to one or more entities-which resides across all physical networks. A network may include any combination of traditional computers, cell phones, mobile devices, game consoles, servers, routers, switches, clouds, and/or any other data processing device or construct.

The components may include data server 103, web server 105, and client computers 107, 109. Data server 103 provides overall access, control and administration of databases and control software for performing one or more illustrative aspects of the invention as described herein. Data server 103 may be connected to web server 105 through which users interact according to aspects of the invention and obtain data as requested. Alternatively, data server 103 may act as a web server itself and be directly connected to the Internet, or web server 105 might be used in embodiments where server 103 has no WWW-facing services. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105, or via direct communication by communicating data according as further described herein. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. I/O 119 may also include a variety of input and output devices, such as mice, keyboards, displays, printers, game controllers, joysticks, buttons, directional pads, keypads, auxiliary input buttons, volume controls, and the like, regardless of whether I/O 119 is provided as part of data server 103 or via some remote device (e.g., game controller, cell phone, etc.). Memory 121 may further store operating system software 123 for controlling overall operation of the data processing device 103, control logic 125 for instructing data server 103 to perform aspects of the invention as described herein, and other application software 127 providing secondary, support, and/or other functionality which may or may not be used in conjunction with aspects of the present invention. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Devices 103, 105, 107, 109 may all represent client devices having system architectures similar to that described with respect to device 103, such that devices 103, 105, 107, and 109 operate in a peer-to-peer manner. Alternatively, device 103 may act as a server for client devices 107, 109, as well as other client devices (not shown).

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

According to an illustrative aspect of the invention, a computer game may be played on or in concert with any of devices 103, 105, 107, 109, such as on a conventional computer, game console (in concert with game controller 110), portable game device, mobile device, or the like. As used herein, the term computer game is meant to encompass any game played on a data processing device, whether as an arcade game, video game, mobile game, phone game, or a game on a conventional or general-purpose computer, where events are graphically depicted, simulated, and/or visually rendered on a display device in accordance with or based on input received from a user/player of the video game in view of an overarching plot, goal, or objective of the video game. Similarly, sounds, sounds effects, ambient noise, and other audio portions of the video game may be output via one or more speakers, headphones, or the like, so that the sounds are experienced by the user/player of the video game.

According to an aspect of the invention, symbolic visual cues or alternatives may be used when playing the game in a "silent" mode or for the hearing impaired. Tactile/haptic feedback may also be provided through a vibrating game controller or other tactile feedback device, virtual reality helmet, gloves, bodysuit, screen display mask, etc. As indicated above, aspects of the computer game may incorporate an agent character having hyper-fast abilities. The computer game may incorporate obstacles and/or adverse events that the agent attempts to overcome or beat using his/her hyper-fast abilities.

A user may control various game play aspects using a game controller 110. Game controller 110 may encompass any or a combination of a variety of input devices, such as a mouse, keyboard, joystick, gamepad, 3D mouse or wand, motion-sensing input device, or any other device having one or more input mechanisms (buttons, D-pads, thumbsticks, motion sensors, triggers, etc.). The computer game control logic 125 translates the user input into actions to be performed or simulated in the computer game, which is graphically depicted on a display device, e.g., based on ray-tracing, rasterizing, and the like. Alternatively or in addition to game controller 110, a user may provide voice input to the game or entertainment media using a microphone. The game software may include voice recognition logic to interpret the voice input and respond accordingly. In other aspects, motion sensed input may be provided, e.g., as used with the Nintendo® Wii® game console. Head tracking and/or finger tracking may optionally be used as well, e.g., as taught by YouTube® videos with IDs "Jd3-eiid-Uw" and "0awjPUk-BXOU", and as described at johnnylee <dot> net <fwdslash> projects <fwdslash> wii.

The control logic 125 may query a database 129 of enhancements, vulnerabilities, obstacles, situations and/or challenges on which the computer game is based. Database 129 may alternatively be stored on some other device and be accessed remotely (e.g., via the internet). The database may indicate, for each enhancement, one or more attendant vulnerabilities associated with the enhancement. The database may indicate, for each vulnerability, one or more other enhancements that may counteract that vulnerability (separate from the enhancement causing the vulnerability in the first place). The database may indicate, for each challenge, one or more enhancements necessary to overcome the challenge or to otherwise make the challenge easier to complete, and one or more vulnerabilities that would make the challenge more difficult.

As used herein, an enhancement refers to any character capability or character trait not necessarily shared among all characters in the game or media, and that gives the character possessing the capability/trait an advantage over another character, a vulnerability refers to any character capability or character trait not necessarily shared among all characters in the game or media, and that gives the character possessing the capability/trait a disadvantage as compared to another character; an obstacle refers to any object, action or event that serves to impede the progress of a character—an obstacle may or may not have been generated by a character using an enhancement, and may have been placed independent of any character enhancement. Table 1, below, is a sample table of vulnerabilities and obstacles, and their relationship to each other according to one or more illustrative aspects of the invention. Each table below may be implemented as a separate table in a database, as a lookup table in an array, or in any other programming construct or data structure.

TABLE 1

Vulnerabilities, Corresponding Obstacles, and Effects

| Agent Vulnerability | Obstacle that incites vulnerability | Consequence to Agent |
|---|---|---|
| Sensitivity to strobe phenomena | Flickering lights Strobe light Light through trees CRT line-scanning | Moderate seizure & must back up |
| Sensitivity to vibrato music | Church organ sound Cello/viola/violin Electric guitar | Head pain & short down time |
| Radio waves of certain frequency | Proximity to mobile phone | Temporary paralysis |
| Flickering flames | Fireplace House burning Forest fire Lit match close by | Difficulty breathing & must slow down |
| Repetitive flowing visual patterns | Cascading waterfall Jet exhaust trail Race cars circling track Swarms of birds or insects | Dizziness & short down time |
| Wave patterns | Pebble dropped in water Series of shore waves Fabric rippling in breeze | Mesmerized & cannot act for 30 seconds |
| Quickly repeating images | Train passing fast Rotating wheel spokes Samba dancer's legs Motion picture | For two minutes, can only act in 10-sec intervals n-seconds apart (e.g., n = 10, 20, etc.) |
| Repetitive percussion | Monotonous drum beat Tap dancing sound Castanets clacking Rattlesnake rattling Clapping audience Horse hooves | Slowed down 30 seconds & 4 bank points subtracted |
| Repetitive ball motions | Ping pong match Tennis match Bolo performer Balls being juggled | Hyper-fast motion enhancement blocked for 2 minutes |
| Repetitive tones | Cicada trilling Beeping alarm clock Busy signal | Slowed down 30 sec & no fast learning for rest of game |
| Touch sensations that repeat or vibrate | Patting by hand Periodic fan breeze Batting of moth wing Passing truck rumble | Out of action for n minutes or seconds (e.g., n = 5 minutes) |

Table 2, below, illustrates relationships between various enhancements (E) and various subchallenges (SC). That is, Table 2 may be used to determine whether a particular enhancement is capable of overcoming a particular subchallenge in a game-playing embodiment of the invention.

TABLE 2

Enhancements effects against subc allenges

|  | SC A | SC B | SC C | SC D | SC E | ... |
|---|---|---|---|---|---|---|
| E1 | X | X | Z | Y | Z | ... |
| E2 | Y | Y | Y | X | X | ... |
| E3 | X | Z | Z | Z | Y | ... |
| E4 | Z | X | Y | Y | Y | ... |
| E5 | Y | Z | X | X | X | ... |
| ... | ... | ... | ... | ... | ... | ... |

In Table 2, an X indicates that the enhancement prevails. "Prevailing" may encompass or be illustrated by the software, media, or game rending an animation or movie-like sequence depicting the agent overcoming the challenge. Alternatively, "prevailing" in the charts herein may simply imply that the enhancement (or applicable feature) is capable of prevailing if the player, upon providing input to the game to enter a mode of game play based on the hyper-fast ability/enhancement, successfully controls the agent while in such mode to overcome the challenge; a Y indicates that the enhancement fails, and a Z indicates that the enhancement prevails but with some time setback or other negative impact as compared to X. Table 3, below, illustrates relationships between various enhancements (E) and various obstacles (O). That is, Table 3 may be used to determine whether a particular enhancement is capable of overcoming a particular obstacle in a game-playing embodiment of the invention.

TABLE 3

Enhancements effects against obstacles

|    | O A | O B | O C | O D | O E | ... |
|----|-----|-----|-----|-----|-----|-----|
| E1 | X   | Y   | Z   | Z   | Y   | ... |
| E2 | X   | X   | Y   | X   | X   | ... |
| E3 | Y   | Z   | X   | X   | Z   | ... |
| E4 | Z   | Y   | X   | X   | X   | ... |
| ... | ... | ... | ... | ... | ... | ... |

In Table 3, an X indicates that the enhancement prevails over the obstacle; a Y indicates that the obstacle prevails over the enhancement, and a Z indicates that the enhancement prevails but with some time setback or other negative impact as compared to X. Table 4, below, illustrates relationships between various obstacles (O) and various vulnerabilities (V). That is, Table 4 may be used to determine whether a particular obstacle is capable of stopping a particular player based on that player's vulnerabilities in a game-playing embodiment of the invention.

TABLE 4

Obstacles effects against vulnerabilities

|    | V A | V B | V C | V D | V E | ... |
|----|-----|-----|-----|-----|-----|-----|
| O A | Y  | Z   | Y   | Z   | X   | ... |
| O B | X  | X   | Z   | X   | V   | ... |
| O C | X  | X   | X   | Y   | Z   | ... |
| O D | Z  | Y   | X   | X   | Y   | ... |
| ... | ... | ... | ... | ... | ... | ... |

In Table 4, an X indicates that the obstacle blocks the player unless or until the player uses an appropriate enhancement; a Y indicates that the vulnerability is not affected by the obstacle and the player can continue unimpeded, and a Z indicates that the obstacle has at least some negatively impacting effect on the player, e.g., resulting in a time setback. Table 5, below, illustrates relationships between various enhancements (E) and various chief challenges (CC). That is, Table 5 may be used to determine whether a particular enhancement is capable of overcoming a particular chief challenge in a game-playing embodiment of the invention.

TABLE 5

Enhancements effects against chief challenges

|    | CC A | CC B | CC C | CC D | CC E | ... |
|----|------|------|------|------|------|-----|
| E A | X   | X    | X    | Y    | Y    | ... |
| E B | Y   | X    | Y    | Y    | X    | ... |
| E C | X   | Y    | X    | X    | X    | ... |
| E D | Y   | Y    | Y    | X    | X    | ... |
| ... | ... | ...  | ...  | ...  | ...  | ... |

In Table 5, an X indicates that the enhancement prevails or is capable of prevailing over the chief challenge if the player is capable at the present skill level; a Y indicates that the enhancement is not capable of defeating the chief challenge.

Figure 2:
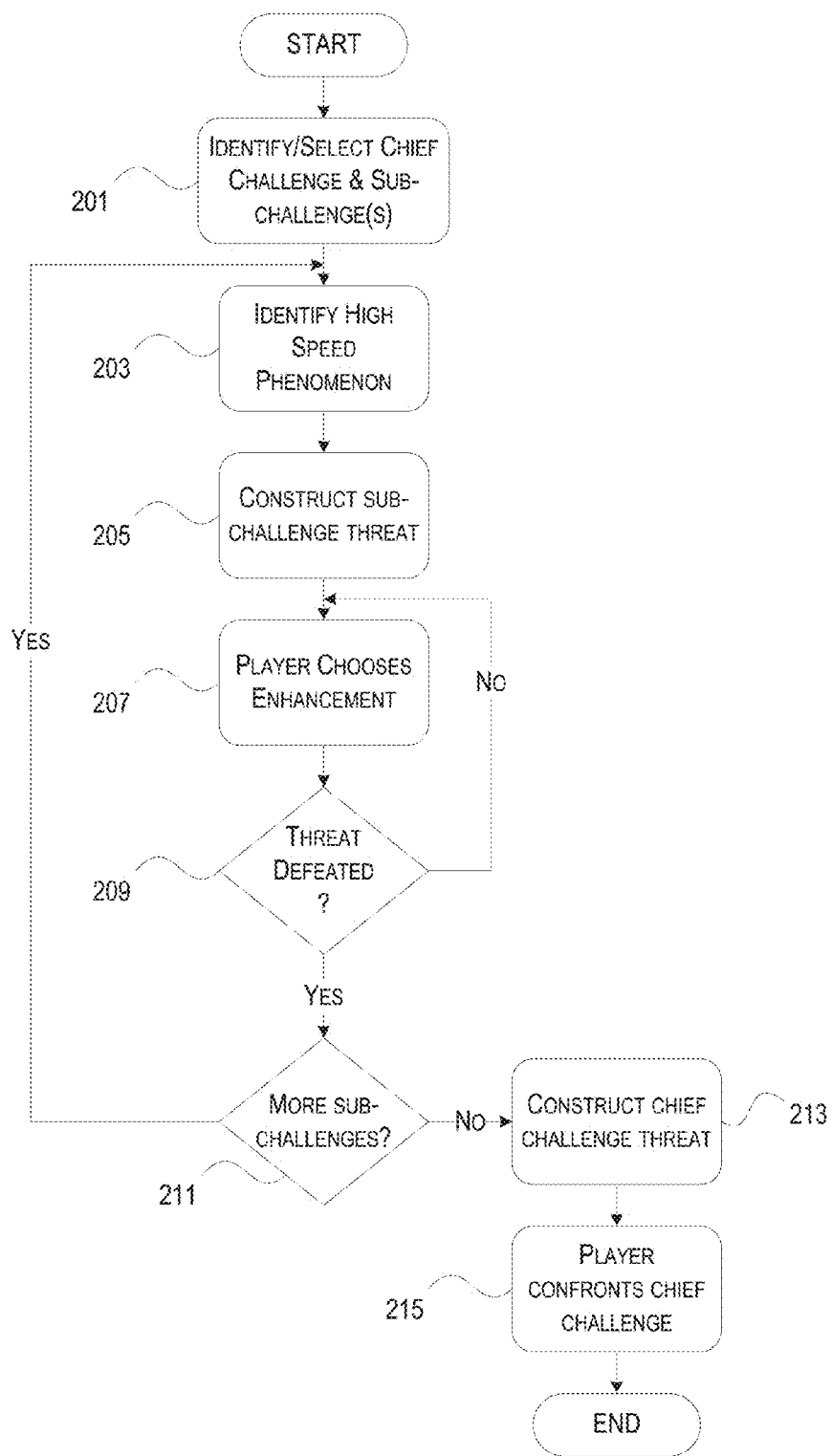
FIG. 2 illustrates a flowchart for a method of game play according to one or more illustrative aspects of the invention.

With reference to FIG. 2, a general game play method is provided herein. The game may begin by identifying a chief challenge in step 201. According to some aspects of the invention, the game might have only a single chief challenge, and the chief challenge may remain the same each time the game is played. According to other aspects, the chief challenge may differ from game to game, such that the player is provided a larger variety of chief challenges. For example, a chief challenge may include stopping an evil character plotting to take over the country, world, or universe. An alternative chief challenge may be rescuing another character that has been taken hostage or prisoner. Yet another chief challenge may include overcoming an enemy army threatening to destroy the agent's (or another character's) home (e.g., destroy the planet, drop a bomb on a home city, etc.). Still another chief challenge might include solving a puzzle or overcoming another human user also playing the computer game. The chief challenge may be selected by either the player, or automatically by the computer game control logic 125.

After identifying or selecting the chief challenge, the computer game constructs or selects a series of one or more sub-challenges that must be overcome before the player (controlling the agent) confronts the chief challenge. Sub-challenges may include overcoming lesser enemy characters, solving puzzles, collecting items or earning money, or any other predefined requirement that must be met before the chief challenge is confronted by the agent. Sub-challenges may be predetermined or constructed "on the fly" as further described below with respect to step 203.

In step 203 control logic 125 may select a hyper fast ability (further described below) around which to construct a sub-challenge, and in step 205 constructs or selects a sub-challenge based on the hyper-fast ability. Alternatively, the hyper-fast ability and/or sub-challenge may be selected randomly.

In step 207, when confronted with the sub-challenge, the user selects a hyper-fast ability with which to combat the sub-challenge. That is, the sub-challenge may be presented to the user via graphical depictions and/or renderings of simulated environments on a display device, with which the user interacts by controlling a game character (e.g., the agent) using one or more input mechanisms of game controller 110. The user may select a first hyper-fast ability by selecting a first input button (e.g., 'A', green, or 'X' might indicate a hyper-fast movement mode), or may select a second hyper-fast ability by selecting a second input button (e.g., 'B', red, or 'Y' might indicate a hyper-fast learning mode). Other abilities may be available as well, selectable using other predetermined user inputs.

In step 209 the control logic 125 determines whether the user input meets a required predefined criterion/-a or whether the user input controls the agent to meet a required predefined criterion/-a necessary in order to overcome the sub-challenge. If so, the method proceeds to step 211. If not, the method returns to step 270, where the user continues his or her attempts to overcome the sub-challenge. In step 211 control logic 125 determines whether there are any remaining sub-challenges before the agent confronts the chief-challenge and, if so, returns to step 203. If no sub-challenges remain, game play continues to step 213.

In step 213 the control logic 125 constructs the chief challenge. As used throughout, for both sub-challenges and chief challenges, to "construct" may mean any of a variety of computational activities, including selecting a predetermined or predefined item or threat scenario, building a new threat scenario "on the fly" based on abilities of the agent or previous accomplishments achieved within the game, or any combination of the two. In step 215, the user interacts with the chief challenge in a similar manner as other challenges (but the chief challenge is typically the most difficult challenge in each game) until the player overcomes the chief challenge, at which point the game ends.

The method described with respect to FIG. 2 is merely illustrative. Other game play methods may be used in addition to or alternatively to that described above. For example, the chief challenge might not signal the end of the game, but rather might end a chapter or episode, and the game may continue with other challenges, episodes, and/or chapters. The method of FIG. 2 may be repeated any number of times per game, and may accommodate additional levels of challenges (e.g., chief, primary, secondary, tertiary challenges, etc.). Any method is suitable that provides for a sequence of challenges and counteractions in a timed or untimed sequence that lead's to the agent's confrontation of a chief challenge. The method may also include steps, instances, and/or plot points where the agent cannot overcome a given challenge and must proceed anyway; the agent is graphically depicted as almost failing to overcome a challenge, and then narrowly achieving victory; the agent's abilities and/or vulnerabilities very nearly, but not completely, result in the agent's demise; and/or the agent is depicted as suffering emotionally from damage done to friends and/or family as a result of his/her actions. The computer game may optionally include life lessons whereby the agent reflects on the implications of the game events, or whereby the agent (or player) reviews the sequence of play, to thereby educate the user/player about the ramifications of one's actions.

In accordance with the above described method, control logic 125 defines and/or provides various game features, further described below. Each game feature may be used in combination with other described game features, or may be used at the exclusion of other game features.

Figure 3:
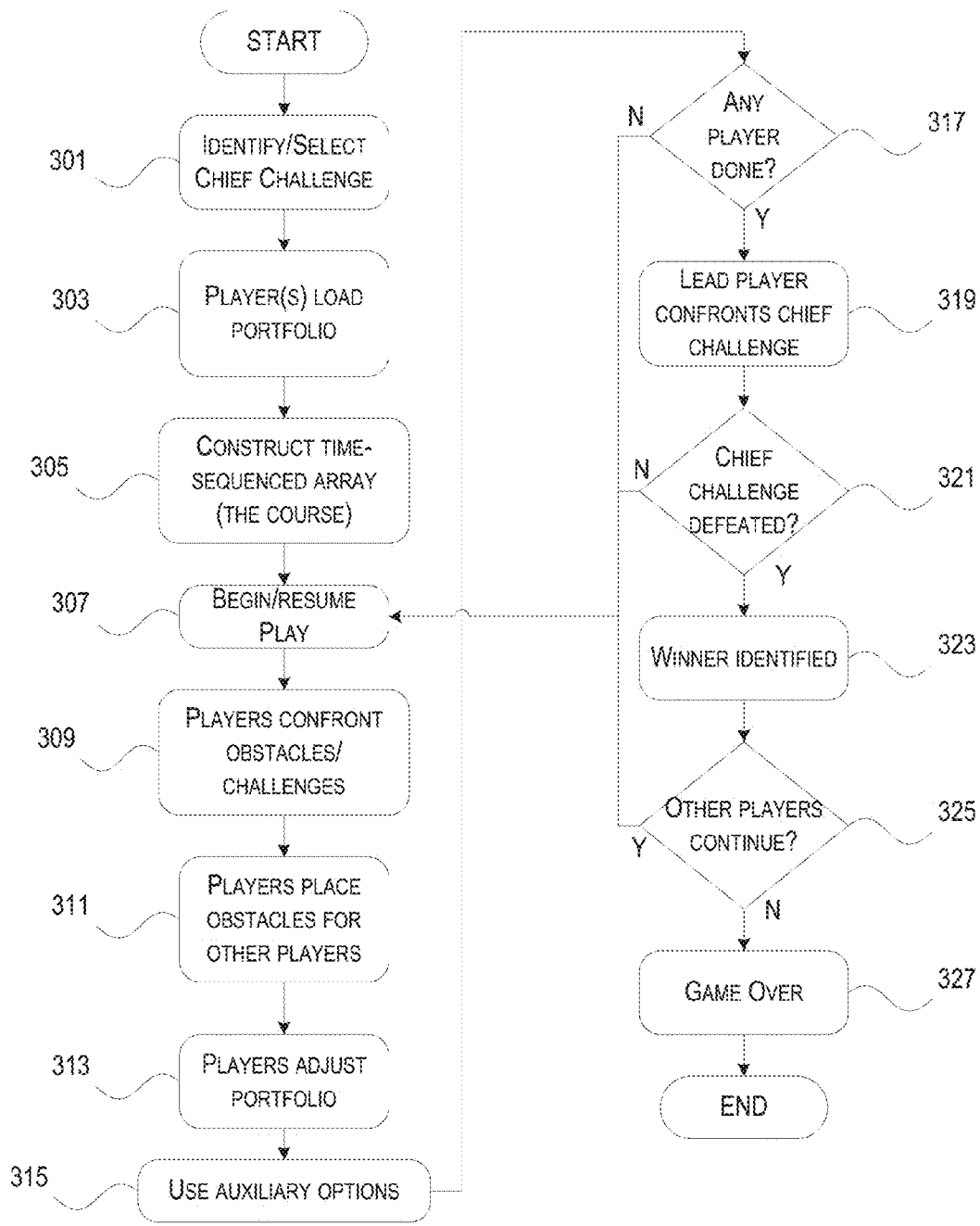
FIG. 3 illustrates a flowchart for another method of game play according to one or more illustrative aspects of the invention.

With reference to FIG. 3, another illustrative method is provided herein. In step 301 the control logic, the player, or a competing player in a multiplayer game selects a chief challenge. The chief challenge may include, e.g., rescuing a kidnap victim, stopping a bomb, or overcoming a horde of enemies. In step 303, each player may select from multiple possible enhancements, vulnerabilities, and/or obstacles at the beginning of the computer game or at some other predetermined time. Enhancements may include a hyper-fast reading ability; ability to analyze virtually undetectable facial expression; super speed; etc. Vulnerabilities may include disorientation and/or incapacitation due to lack of sleep, seizures due to detecting flickering lights that otherwise go undetected by normal humans; distraction by rhythmic stimuli; shortened life span; and paranoia or fear of shortened life span. The obstacles may correspond to one or more of the selected vulnerabilities and/or enhancements. Obstacles differ from challenges insofar as a player can use an obstacle against another player, e.g., by throwing a strobe light in the path of a player with a sensitivity to rapidly blinking lights.

Each of the enhancement, vulnerabilities, and obstacles may have a positive or negative value reflecting its magnitude of advantage or disadvantage, and each player may be required to select a minimum limit value total of vulnerabilities and a maximum limit value total of enhancements and obstacles. Obstacles may be chosen by a player to be used against an opponent(s), or may be selected by the control logic where the player is playing a single player game, i.e., against a predefined "course" defined by the game software. In another alternative, the player can play against an opponent generated by the computer. The player can then play the computer game against the selected route or course (the generated sub-challenges and selected obstacles, etc.) for time and/or skill ratings, against another human player on the same device or over a gaming network, or against a computer-generated player/opponent.

In one illustrative embodiment of the invention, in step 305 the computer creates a time-sequenced array of events (e.g., array of sub-challenges) leading to the chief challenge (e.g., to be first to arrive at a targeted location). The array of sub-challenges may be balanced by the computer at the beginning of the game so as to give each player an equal or near-equal chance based on each players' selections of enhancements, vulnerabilities, and obstacles, and/or based on a player's skill level or experience.

In step 307 game play may begin with a simple challenge, e.g., a carrier pigeon flying by that must be caught by hand so the message it carries can be read, which serves both to accustom the player(s) to the controls necessary to control their respective agent(s), as well as provide instructions to the user regarding the game's objectives. The fastest-reacting player who has the required enhancement (e.g., catching fast-moving animals without harm) wins the initial challenge and the other player(s) may be set back by a time interval or other decrement in capability set or by subtraction of points from a player's point total. Other simple challenges may also be used near the initiation of game play.

As game play continues in steps 309-311, players confront the challenges selected for the game, one player may have the option to present new challenges to other players in the game, selected from a set of earned add-on (or given) challenges, which are given to the other players, thereby allowing the one player to proceed unimpeded relative to the other players. However, giving the challenge to other players may cost the one player points or some other limited resource from a "bank" associated with the player. As used herein, each player's "bank" refers to one or more items, points, currency, or other limited resource the player has accrued in the game. Players may also plant obstacles to impede other players, thereby causing other players to suffer setbacks when the other players encounter the planted obstacles. Obstacles may also be planted by the control logic as part of the game. Obstacles may have more or lesser effect based on whether the obstacle corresponds to a vulnerability of the other players. For example, if one player plants a flickering light along a path that another agent must traverse, the other agent might be impeded if the other agent is vulnerable to flickering light, but the other agent might not be impeded at all if the other agent does not have a specific vulnerability to flickering lights. In this manner players can learn the vulnerabilities and enhancements of their opponents by observing the results of obstacles and challenges, and adjust their play accordingly.

During game play in step 313 players may be able to trade their selected enhancements, vulnerabilities, and/or obstacles for other enhancements, vulnerabilities, and/or obstacles from a menu, either as equal trades or by spending points from their bank on a value-weighted basis. Swapping characteristics allows players to modify their portfolio and their play based on what they have learned about their opponents (who can also adjust their portfolios). Another optional modification may include the game control logic 125 randomly generating decoy challenges (e.g., a face that may be expected to contain revealing microexpressions, but in fact does not) in an attempt to cause a player to waste time and/or reveal enhancements and/or vulnerabilities to opponents, with no reward.

According to another illustrative aspect, in step 315 the control logic 125 may respond to a player providing user input indicating a desire to "mutate" or change abilities. Upon detection of the predefined user input, control logic 125 generates a new, random selection of enhancements, vulnerabilities, and/or obstacles, preferably having the same or similar weighted value total of points held by player at the time of the mutate request. The mutate function allows a player to evade the learning of an opponent, or to gain new tools if the player has exhausted his or her current set of abilities. Optionally, the player opting to "mutate" may also come at a cost, e.g., by reducing points or some other limited resource from the player's bank. In step 315 a player may alternatively or additional provide input selecting to use another auxiliary capability, e.g., ultraspeed, reveal (one or more enhancements of one or more other players), conceal, disguise, horizon, as further described below.

According to some aspects of the invention, the elapsed time of the game may incur a running cost against each player's bank, or there may be a limited amount of time during which each player can attempt to complete one or more objectives. By deducting points for elapsing time, a time pressure is placed on the players. An alternative method may include having a time limit for each objective, and the player either accomplishes it or not in the allotted time.

According to another aspect of the invention, a player may trade or spend bank value in order to reveal one or more enhancements and/or vulnerabilities of one or more opponents, or their current bank values. The selection of the revealed abilities may be random, and may be any number from one up to the total number of abilities the other player(s) has. According to one variation, at the outset of a game each player optionally may be shown a subset of their opponents' enhancements and/or vulnerabilities. In addition, opponents' enhancements and/or vulnerabilities may be displayed on other player's screens as they are learned, where each player has his or her own display screen. This "reveal" feature may optionally cost the requesting player some predefined value from his or her bank, e.g., based on how many enhancements and/or vulnerabilities are revealed, or based on the point value of the revealed enhancement and/or vulnerability. In addition, a player may optionally subtract an enhancement or add a vulnerability to an opponent's current list of abilities, with an optional cost to the player's bank.

According to another aspect, when a first player attempts to respond to a challenge, other players may see what the first player attempts, for example, by the control logic graphically depicting the first player's agent performing the attempted response. Other players can thereby learn the enhancements (and/or vulnerabilities) associated with other characters, and adjust their own game play strategy accordingly. Optionally, a player may select a "conceal" option whereby the player's agent attempts to solve the challenge in secret, e.g., on other players' screens graphically depicting a curtain being drawn around the agent while the agent performs the attempt, so that only the agent performing the attempt can clearly view his or her progress. The "conceal" feature may optionally cost the concealing player some predefined value from his or her bank.

According to another aspect, a first player may select a "disguise" option to temporarily appear to be another player in the game. When the "disguise" option is selected, the control logic may select another player at random, and graphically depict the first player to appear as the randomly selected player for some limited period of time (up to the remainder of the game). Alternatively, the first player may select which other player to be disguised as, for strategic purposes. The "disguise" feature may optionally cost the disguising player some predefined value from his or her bank.

According to another aspect, control logic 125 may display on the display screen an indication of one or more upcoming challenges, or each player may request that such a list be displayed, e.g., by providing predefined input indicating the user would like to see what challenge(s) is/are next ("on the horizon"). Optionally, this "horizon" feature may cost the player some predefined value from his or her bank, and the value may vary depending on how far ahead the player looks.

According to another aspect, a player might only be able to compete as long as the player has points or value left in his or her bank. When all value is depleted from the bank, the player may be sidelined unless and/or until that player is recruited by another team. Bank value may optionally regenerate automatically at some predetermined rate. When the player is sidelined, that player's enhancements and vulnerabilities might optionally be visible or available for review by other players, e.g., to aid in deciding whether to recruit that player or not. Alternatively, when a player has depleted his or her bank, that player might be reduced to a default base set of abilities, e.g., run, jump, etc., but cannot use any optionally provided additional abilities, e.g., conceal, disguise, horizon, etc.

In step 317 the control logic detects whether, during game play, any player has overcome all challenges or, alternatively, only all sub-challenges. If so, then in steps 319-321 that lead player confronts the chief challenge. In the event the lead player is a computer-controlled player, then the control logic may visually depict the computer player winning the game or otherwise overcoming the player-character. If the lead player is a player character and the player overcomes the chief challenge, then that player is identified as the winner in step 323.

In step 325 the other player(s) may optionally decide whether to continue playing, e.g., for second place and so forth. Alternatively, the choice to continue playing may be selected by game settings, control logic, a majority vote of remaining players, or some other selection mechanism. If the other players opt to continue, then play resumes in step 307. If play does not resume, then the game ends in step 327, e.g., with a final movie/animation sequence depicting the victorious player accomplishing his or her objective in overcoming the chief challenge.

In variations of the game where more than two players may compete against each other, players may optionally form teams to compete against each other. Players can thus form alliances based on whether or not they need or desire the enhancements and/or vulnerabilities of their prospective teammates. In one variation, all members of a team share the superset of enhancements and vulnerabilities of every member of their team. In other variations, each team member might only retain his or her own enhancements and vulnerabilities, but can communicate with other team members to coordinate the team's actions during the game. The team may optionally divide any success rewards equally, and may terminate the team alliance upon completion of a challenge (or with advance notice of one event challenge or obstacle). Thereafter, the team's success rewards may be awarded independently. In another mode of game play, all players may be provided with a complete complement of enhancements at the outset of the game, e.g., in an "every man for himself" mode of game play.

In some game modes play on a given round ends when a player or team achieves the chief challenge. In other game modes play may end after a predetermined amount of time. Rounds of play may be adjusted to varying degrees of difficulty by selecting the rapidity or degree of difficulty of the array presentation of sub-challenges and obstacles; altering the enhancements, vulnerabilities, and/or obstacles available to players; and altering character of other parameters, as desired.

Some aspects of the invention may display or output audio and/or video clips (preloaded or imported from other sources, e.g. the Internet) of situations, challenges, obstacles and vulnerabilities. Alternatively, the graphical portion of the game may be graphically rendered based on the control logic 125. A player's character may be portrayed on the display screen, and the character's body, head, fingers and/or limbs may be moveable, e.g., controlled by the player using the game controller 110. Sounds as well as visuals are provided by control logic 125. These sounds may include human speech in one or more languages, ambient sounds, sound effects, and the like.

In some game play modes, an agent might not exhibit hyper-fast abilities at all times, but rather the player can provide predetermined input to cause the agent to enter a "hyper-fast" mode. The hyper-fast mode may continue for some limited duration of time. The player may then cause the agent to perform hyper-fact actions (neurological and/or physiological) while the hyper-fast mode is active. Entering the hyper-fast mode may optionally cause the player to spend or deplete value from his or her bank. Alternatively, when the hyper-fast abilities of the agent are always present, a player may provide predefined input to enter a "brain speed-up" mode to accelerate all or a particular enhancement's actions against a challenge or obstacle, optionally at a cost to the player's bank.

Some game play modes may incorporate a facial lie detection puzzle or feature in which a player must determine whether another character (computer character or other player character) is lying. The lie-detection module may be stored within the computer control logic 125, or accessed by it, e.g. through the internet. The modules may, for example, contain video clips of actual faces during brief expressive moments, referred to as "microexpressions" or "face flicker." One challenge or obstacle in the game might include one player asking the a second player a question, in response to which the second player can choose from multiple possible answers, only one of which is true. For example, the first player might ask the second player "which of the two paths is the safe path?" The second player, knowing the answer is the first path, might instead choose to response that the second path is the safe path. As a result, the control logic might animate the second player's character to indicate via a brief face flicker that the second player is lying. If the first player recognizes the face flicker, then the first player knows the second player is lying and can safely go down the first path. However, if the first player does not recognize the face flicker, then the first player will likely go down the second path, causing harm or delay to the first player.

In some game play modes, players can earn additional points by completing sub-challenges and/or overcoming obstacles placed by other players, or by helping computer generated "characters in need" along the route to the chief challenge. The extra points earned, however, may optionally come at the expense of elapsed time against a master game clock, when used.

The above-described game modes may incorporate a variety of enhancements, vulnerabilities, challenges and obstacles, a sample of which are described herein. Game play is not limited to the enhancements, vulnerabilities, challenges and obstacles described herein, but rather may include additional or other enhancements, vulnerabilities, challenges and obstacles, as desired.

A first type of obstacle may include visual obstacles. That is, as a result of the agent having hyper-fast visual processing abilities, the control logic may simulate detrimental effects resulting from various visual stimuli on the agent. Visual obstacles may include flickering lights, including fluorescent lights near the hyper-fast agent; strobe light(s) and other strobe-like phenomena, e.g., strobe effect from rotating helicopter blades; tree trunks painted white, flashing by in the head lights of a speeding car; sunlight flashing through rows of planted trees, as observed from a moving vehicle; sunlight reflecting off a series of advancing waves of water; spokes of a rotating wheel; a moving Moiré pattern created by relative movement of the observer and two or more overlaid repetitive patterns (e.g. stripes); a fast-moving zebra or other striped animal; repeating ripples in a fabric hanging in a breeze; TV screens or other CRT monitors that display images by repeated line scanning; motion pictures (e.g. rapid display of a series of still images); a rotating wheel that is radially painted with differing colors, or an image of such a wheel; vibrating strings of a stringed musical instrument; rapid swinging of bolos by a bolo performer; rapid and rhythmic bouncing and catching of ping pong balls (or other balls) by an entertainer; rapid and rhythmic volleys by players at a ping pong table or tennis match (and other rapidly rhythmic sporting events); rapidly moving legs of a samba dancer, or other type of dancer, including groups of dancers; rapidly shimmying hips of a belly dancer; a rapid series of lights generated by a fireworks display; rotating propellers or turbine blades; rapidly moving arms and/or hands of a juggler; rapidly moving swarms of birds, fish, or insects; and rapid beating of animal or insect wings. As a result of any of the above, or others, an agent may become hypnotized, disoriented, or have other negatively impacting effects.

Another type of obstacle may include auditory obstacles. That is, as a result of having hyper-fast auditory processing abilities, the control logic may simulate detrimental effects resulting from various audible stimuli heard by the agent. Auditory obstacles may include a tone or tones normally inaudible to the human ear; a tone or tones repeated with a frequency between two predefined limits, e.g., between 2 hertz and 60 hertz or 2 hertz and 100 hertz or 10 hertz to 60 hertz, etc; sounds generated by batting wings of an insect or bird; sounds generated by a cicada or cricket; sounds generated by a rattlesnake's vibrating rattle; sounds generated by percussion instrument(s) played at high speed; sounds generated by hands clapping with a frequency between 2 and 60 hertz; sounds generated by repeated clacking of castanets; sounds generated by a rapidly clicking wind-up toy; a buzzing alarm clock; rapid tones produced by a fax or modem device; sounds generated by a rapid-action printing press or other repetitive industrial machinery; sounds generated by the repetitive clacking heels of a dancer; and the hum generated by high-tension electrical lines.

Another type of obstacle may include tactile obstacles. That is, as a result of having hyper-fast physiological and neurological processing abilities, the control logic may simulate detrimental effects resulting from various tactile stimuli felt by the agent. Tactile obstacles may include rapid patting on skin, by another human or by an animal/insect, or by some physical device; touch perception of repetitive vibrations from any source, at frequencies greater than 2 hertz; and tactile perception of sound waves.

Another type of obstacle may include olfactory (smell) obstacles. That is, as a result of an agent having hyper-fast abilities, the control logic may simulate detrimental effects resulting from various olfactory stimuli smelled by the agent. Olfactory obstacles may include exposure to a pulse-released scent; exposure to minute amounts of a scent undetectable to normal humans (e.g., that may be detectable by hound dogs); exposure to scents through liquid, e.g., smelling blood in the ocean while swimming; and smelling scents from great distances.

Various game modes may include a variety of challenges, some of which have already been described above. Other challenges that may be provided by control logic 125 include, but are not limited to, requiring the agent to catch a grenade in mid-air and throw it to a safe distance before it explodes; catch a carrier pigeon in flight and collect the message it carries; shoot an attacker before the attacker shoots the agent; perceive the minute finger movements of a driver veering toward the agent, so as to evade a crash; urgently discern whether a hostile captive (or other character) is lying; interpret through hyper-rapid pattern recognition who among a group is plotting malicious action; and learn how to operate a complex device (e.g., a laser/GPS coordinate-registering device) by watching a training video at fast-forward speed.

In some game modes, a player may provide predefined input to move the agent at an accelerated speed to accomplish one or more of the challenges. When in such a mode, the control logic 125 may graphically depict the agent to move at normal speeds, while graphically depicting the other characters and or game environment to be moving at slow motion, thereby giving the appearance that the agent is moving very fast relative to the rest of the simulated world and environment, sometimes referred to as "bullet time". Other characters that also have hyper-fast abilities might not be affected by the slow motion effect, and might also still be able to move at normal speeds while the rest of the environment is moving in slow motion. In some embodiments, entering slow motion or bullet time modes may incur a cost against the player's bank.

During game play each agent may be subject to one or more vulnerabilities, some of which have already been described above. Other vulnerabilities that may occur, as controlled and defined by control logic 125, include, but are not limited to, seizure and/or unconsciousness induced by flickering lights, fluorescent lights with certain flicker rates, strobe lights, repetitive visual stimuli, rotating spokes of a wheel at certain speeds, and/or skittering light reflection off water. Agents may also be easily distracted by certain repetitive visual stimuli or sounds with certain repetitive rhythms. Control logic 125 may also simulate the agent as being disoriented, confused, and/or temporarily incapacitated due to lack of sleep, lack of adequate meditation to alleviate sleep deficit, accumulated activity and brain stimulation without break for sleep, risk of early death due to hyper-fast abilities and/or activities, fear due to perceived possibility of early death due to hyper-fast abilities and neurological activities, and adverse reactions from certain animals that can sense the agent's strangeness and/or react to enhancement-related actions.

Through simulating the hyper-fast neurological and neuromuscular system, the control logic may depict the agent performing a variety of actions and/or activities at levels beyond those of a normal human being, including but not limited to, kite-surfing, (kite-boarding); windsurfing; sky-diving; parachuting; skyboarding; BASE jumping; wingsuit flying; surfing; shooting guns or bows and arrows; boxing; martial arts; soccer (or other sports); ball sports; swimming; combat sports; racing vehicles on land or water (including, but not limited to, motorcycles, cars, boats); piloting airborne vehicles; bicycling; video or computer gaming; canoeing and kayaking; rowing; polo; racket sports; running; skiing; snowboarding; free-running and tricking; bullfighting; track and field events (e.g., javelin throwing, shot put, etc.); rock-paper-scissors; skating sports; ping pong; target sports; speedcubing; bowling; climbing; street fighting; fighting with hand-held weapons; juggling; slight-of-hand tricks; remote piloting and/or controlling of unmanned vehicles; operating equipment for video-enabled warfare; any activities in which performance is partially or fully dependent upon reaction time; and/or reflexes.

During each game the player may ultimate confront a chief challenge, some of which have already been described above. Other chief challenges that may be used, as controlled and defined by control logic 125, include, but are not limited to, toppling a corrupt dictator; kidnapping a mafia boss; finding and disposing of a nuclear weapon or arms cache; infiltrating a jihadi cell and tricking its members into getting arrested; obtaining control of a country; assassinating a tyrant; taking over a nation's intelligence organization and redirecting its efforts; rescuing a kidnapped individual; and carrying confidential documents to a designated recipient (e.g., a journalist, in order to expose president-level corruption in a democratic country). Yet additional chief challenges may include capturing a warlord in Africa who commands a child soldier militia; cornering a human trafficker boss in Albania (or another country), for arrest by Interpol; freeing sex slaves locked up at a hidden site in Bulgaria (or another country); stopping the planned assassination of a Russian dissident journalist in exile; taking hostage a corporate CEO in California until he hands over documents proving his company's environment-damaging illegal activities; overcoming pirates who have murderously taken control of a cruise ship off the coast of Somalia; capturing a war crimes perpetrator hiding in Serbia (or another country); and rescuing a child witness held in grizzly conditions by the mafia near Naples, Italy (or another location).

Other challenges might require the player/agent to perform physical movements at a speed not directly observable by normal humans. For example, the hyper-fast neurological system of the agent, coupled with a hyper-fast neuromuscular system enables the agent to perform coordinated physical movements at such speed that the movements are not discernible by a human observer. This is analogous to humans not being able to see the beating wings of a hummingbird in flight, or the flick of a frog's tongue when it captures an insect. Superfast feats may be performed in "bullet time" during game play, or may be animated as a blur during regular game speed.

Examples of super-fast actions that may be required to overcome a challenge include grabbing food from a food stand even as the vendor is looking at the agent; while surrounded by threatening thugs, the agent stabs one of them in the neck, with such speed that none of the other thugs knows why their comrade has been injured; juggling chestnuts (or other objects) with such speed that two children watching him/her cannot see his/her arms, or the number of chestnuts, and thus are entertained; while seated at a table with an adversary who places a top-secret surveillance-enabling microchip on the table, the agent sweeps the microchip, undetected, into his/her hand even as he/she converses with the adversary; an agent, confronted with the possibility that he/she is being stalked by another agent with similar capabilities, performs a super-fast action to determine whether the other agent perceived the movement, and thereby confirm the nature of the stalker.

Other challenges might require a player/agent to use augmented sound detection and interpretation in order to beat a challenge. Sound is a time-dependent and time-sequenced phenomenon. The neurological hyper-speed of the agent results in enhanced hearing, auditory interpretation, tonal discrimination, and registering to memory of sounds to which he/she is exposed. These include simple and complex computer-generated tones; human speech and other vocalizations; songs; animal vocalizations; sounds produced by insects and plants; sonar signals; percussion sounds; sounds generate by musical instruments; sounds generated by locking/unlocking systems; sounds generated by electrical equipment or transmitted over telecommunication systems; sounds generated by engines; sounds generated by climactic events; and others.

Example of sound-related challenges that may be employed during game play include: discriminating and remembering multi-component digital tones that the agent uses later to disarm an explosive device controlled by a tone-generating key pad; discerning by the timbre, frequencies, and modulation of a person's voice whether or not that person is likely to be lying about the critical information the person is conveying; discriminating and registering to memory the sounds produced by a mechanical locking/unlocking device in order to later replicate the unlocking code/combination so as to gain access to the important contents that the locking device protects; discerning whether or not another person's speech is in the genuine accent of that person speaking in a non-maternal language, so as to determine if that person is an imposter, discerning whether the fog horn sound of a ship at night is that of a particular ship suspected of illicitly transporting nuclear arms; discerning whether an unseen passing motor is that of an ally's vehicle, and thus know whether the vehicle carries people who intend to rescue the agent from captivity, or to cause the agent harm.

Other augmented sound detection and interpretation capabilities may include echo-location, auditory localization and high frequency sound detection. For example, human perception of sound is generally limited to sounds having frequencies between 20 and 20,000 Hertz. Among normal humans, there are differences in the range of detectable frequencies; for example, pre-adults generally can detect frequencies at the upper range of normal human audition, but after adulthood, hearing at these higher frequencies diminishes or is lost altogether. The hyper-fast neurological system of the agent results in the ability to perceive sounds in frequency ranges above (and/or below) those detectable by normal humans.

Examples of obstacles and challenges based on high-frequency sound detection may include: hearing or perceiving a threatening animal or insect by the ultra-high frequency sound it emits, in order to evade harm; hearing a dangerous electronic device that emits ultra-high frequency sounds and no other sounds that normal humans can detect, in order to track the source of the sounds and disable the device; and hearing a dog whistle blown by an adversary, signaling an impending attack by guard dogs. Other obstacles and challenges may be used as well.

Echo-location refers to the agent using the hyper-fast neurological and neuromuscular system to echo-locate animate and inanimate objects. Echo-location (as an example, in bats) requires emission of sounds and very rapid processing of reflections of those sounds off objects in the environment. Concomitant rapid reorienting of the sound detectors (a bat's ears, for example), combined with discrimination between times of arrival of sound signals at one ear versus the other, enables characterization of an object's size, shape, sound-reflective qualities, speed, and trajectory.

One example of a challenge that may incorporate echo-location is where the agent is moving through a lightless building, and must discern through echo-location the positions and/or trajectories of hidden enemies who intend to do harm to the agent, a hostage whom the agent must rescue, projectiles or objects thrown or aimed at the agent (e.g., a gun that swings to point in the agent's direction, a bullet fired at the agent, or a club or axe thrown at the agent), a hole in the floor through which the agent might fall. Another challenge might place the agent in a lightless setting, and requiring the agent to perceive a sword (or other object) approaching him/her at high speed, so as to avoid being injured.

The hyper-fast neurological and neuromuscular system of the agent may also be used to perform auditory localization, i.e., the ability to detect sounds so precisely that the agent can discern location and movement of animate and inanimate objects that produce sounds either when immobile or as they move. The hyper-fast neurological system of the agent is sensitive, in part, to the "Doppler effect," which results in a change in perceived frequency of a wave phenomenon (e.g., sound) as the vector or speed of the wave-source emitter changes relative to the location of the wave-recipient.

Examples of challenges and obstacles that may require the agent to use auditory localization include: discerning the trajectory of an unseen rocket-propelled grenade as it whistles through the air, so as to avoid being hit by it; localizing the source of a gunshot as the sound of the gun reflects off various building walls in an urban environment; and determining the speed of a passing car by the change in sound occurring as the car passes, and adjusting the trajectory of a mortar to accurately hit the vehicle as it drives away.

The hyper-fast neurological and neuromuscular system of the agent may also be used to perform hyper-rapid visual detection of moving objects, and hyper-rapid responses based on the visual detection. The hyper-fast neurological and neuromuscular system of the agent results in abnormally high-speed visual perception of moving objects, anticipation of their trajectory, proprioception and bodily movements to react to the moving objects, whether animate or inanimate. Examples of challenges or obstacles include: catching a thrown knife or spear before it can do damage; catching a thrown grenade and tossing it to a safe distance away before it explodes; catching a bee or wasp by the wing in mid-flight before it alights on or harms a human; juggling multiple objects at a speed unattainable by normal humans; judging the movement of a gun barrel to a point of aim at the agent such that the rapid anticipation and body moments of the agent enable the agent to evade the fired bullet; hand-catching a hummingbird in flight, with no damage to the bird; catching fish in water by hand; hand-to-hand combat with an opponent; and participation in ball sports that require eye-hand or eye-foot coordination.

The hyper-fast neurological and neuromuscular system of the agent may also be used to perform accelerated learning. The hyper-fast capabilities of the agent provide the ability to learn at speeds far above normal human rates. Examples of challenges and obstacles incorporating hyper-fast learning include: the agent must learn how to operated a complex electronic device with numerous controls in a very short amount of time (e.g., 30 seconds), with which the agent can eliminate an approaching aerial missile; quickly learning the layout of labyrinth passages to rescue a hostage victim, identify alternative routes through the labyrinth, and do so at a single glance at the layout (e.g., <5 seconds); learning the parameters of a complex casino betting game by observing others play it (e.g., in a single game, round, hand, or in some short period of time), and then play the game in a session for which the agent's life is at stake; learning to play a musical instrument with just a single lesson or single day of training so that the agent can perform as a plausible imposter for a maestro; rapidly learning how to perform a complex surgical operation to save the life of another character, so that the other character can provide essential information.

Additional challenges that may require the player/agent to use a hyper-fast learning ability to overcome the challenge include the following. The agent might be required to urgently learn a new technique by watching an instructional video on fast-forward, e.g., learning makeup and disguises by watching, in fast-forward, a video of an expert special-effects artist at work. The agent may then subsequently use the techniques on himself/herself to make it appear he/she has been gruesomely injured, or otherwise disguised. The agent's accelerated learning and hyper-rapid perception may also be used to observe and learn other procedures or information presented at high speed, for example a video on fast forward, or a sound recording on fast forward, etc. Other challenges might include rapidly learning to operate a fighter jet in order to destroy debris from a satellite collision, before it hits a densely populated area; rapidly learning to operate an armed, remotely piloted airborne vehicle; and rapidly learning to pilot a helicopter.

Additional enhancements based on hyper-fast abilities may also be used as a basis for solving one or more problems or challenges, as defined by control logic 125. Some challenges may require voice impersonation to beat the challenge. That is, the combination of hyper-rapid muscular control, hyper-fast time-parsing and interpretation of sounds (both sounds from the exterior and those generated by the agent's own voice), and accelerated learning, enable the agent to accurately impersonate the voices of other people as well as vocalizations of animals. Input controls may be manipulated until the player causes the agent to make the correct sounds, e.g., by moving or adjusting a joystick on the game controller 110, or by actual player vocalization detected by the computer or any other data processing device.

Examples of challenges requiring voice impersonation include a situation in which the agent must impersonate the voice of a tyrant speaking over the phone to the tyrant's military chief, in order to persuade the military chief to redeploy forces far from the tyrant's (or agent's) location, so as to enable a coup against the tyrant or to evade capture by the tyrant. The agent might learn to impersonate the tyrant faster by listening to recordings of the tyrant's voice, i.e., the control logic might provide a wider "acceptable" range of input if the player has caused the agent to listen to recordings of the tyrant's voice.

In another challenge the agent must impersonate the voice of a member of a terrorist cell, to disrupt the cell's plan to cause harm and/or destruction, e.g., by sinking a cruise ship. The agent might train his or her voice or otherwise learn to impersonate the terrorist's voice by interviewing the terrorist who is being held captive.

In another challenge the agent must impersonate the voice of one character imploring another character not to commit suicide. For example, a father convincing a child not to commit suicide. Unbeknownst to the child, the father is dead. The agent learns the father's voice by listening to old recordings of the father's voice.

The hyper-fast learning abilities may also be used to perform hyper-fast language acquisition. Hyper-rapid brain cycle times can enhance memory formation by increasing the number of neural conditioning events per experience. Some linguistic experts estimate that normal learners of a new language must hear and speak a new word approximately 30 times before it is registered in long-term memory for facile use. A hyper-fast brain with, for example, a cycle time of 30 times that of a normal person, neurologically experiences the single hearing and speaking of a new word the equivalent of 30 times, and so captures it for future use in a single hearing/speaking cycle. Similar rate enhancements apply to acquisition of language syntax and other language parameters. The hyper-fast neurological and neuromuscular system of the agent results in very rapid new language acquisition. An example of a challenge that incorporates rapid language acquisition might include, while imprisoned before execution, observing the conversations and actions of the agent's foreign hostage takers and swiftly learning their language, thereby becoming able to talk one of the agent's captors into enabling an escape. In another example, the agent may be required to quickly learn to speak a new language in order to infiltrate a network of people dealing in illicit arms. The agent may learn the language by reviewing language instruction videos at high speed. Hyper-fast learning and language acquisition may also include hyper-fast memorization skills and/or abilities, for example, for use in a challenge requiring the agent to urgently memorize a series of alpha-numerical codes to be used to deactivate an explosive device. In another example, the agent must memorize, based on a single short review, which faces in a composite photo belong to comrades, victims and perpetrators who will be involved in an upcoming mission. In yet another example, the agent must quickly memorize a series of passwords for each of several persons in different countries with whom he/she must make clandestine contact.

Hyper-fast pattern recognition may be used in one or more challenges. The hyper-fast abilities of the agent enhance speeds of perception and interpretation, and thus enable enhanced speeds of pattern recognition. Patterns may be in real life, may be simulated or graphically rendered, or presented in any form of media, including photographs, computer screens, video or film displays, audio recordings, audio transmissions, paintings, sculpture, print media, etc. Examples of patterns include human and animal faces, human and animal physical features other than faces, cartographic configurations, microchip layouts, signature movements (including gaits) of humans and animals, software code, constellations of stars, topological settings, configurations of electrical or mechanical devices, configurations of attitudes and relationships within a group of people, vibrations, shapes of plants, terrain, auditory stimuli, gustatory stimuli, olfactory stimuli, tactile stimuli, human speech, animal vocalizations, specific combinations of city sounds, specific combinations of rural sounds, music, percussive sounds, and combinations of stimuli from visual, auditory, gustatory, olfactory, proprioceptive and/or tactile sources.

One or more challenges may require the player/agent to use hyper-fast pattern recognition to beat the challenge. Examples include: upon taking off a blindfold, the agent must quickly discern his/her location by observing the nearby coastal contours and outlying islands, and comparing their configuration with places the agent has been or seen on maps, and formulate an escape route; the agent is enlisted to help a navy's submarine detection unit to discriminate among various short-lived underwater sound signatures generated by an adversary's submarines and by friendly submarines, to determine which is likely to be carrying unfriendly nuclear weapons; and observing a flock of birds flying in a seemingly random pattern, but which actually is not random, to identify a source of danger from which they are flying.

Other challenges, as indicated above, may require the use of microexpression detection, interpretation and/or suppression. The hyper-fast abilities of the agent may provide the ability to perceive short-lived (e.g., less than one second) human facial expressions that otherwise are only observed by high-speed filming or video-taping of individuals. These "microexpressions" indicate unfiltered emotional reactions and subliminal states of mind, and have been shown, for example, to reveal lying by the subject, as well as other states of mind that otherwise may be concealed by the subject. Microexpression detection may be used in concert with hyper-fast pattern recognition, described above.

According to an aspect of the invention, microexpression detection and/or training may occur by first displaying video at normal speed, then playing the same video in slow motion (actual or simulated slow motion) during which the microexpression becomes apparent, or more apparent, than when the video is played at normal speed (e.g., during regular game play). For example, in one embodiment, when a player believes that microexpression detection may provide valuable information, the player can enter a microexpression detection mode within the video game (optionally, only when the player possesses the appropriate enhancement can the player enter the microexpression detection mode). The video game control logic may or may not cause a video of a person to be played at normal speed before playing the video at a slower speed. When the video game control logic plays the video in slow motion, the video game control logic depicts a predetermined facial expression that was not observable in the regular speed video. The player controlling the agent reviews the video at the slower speed, and then must identify what the predetermined facial expression represents, e.g., lying, fear, arrogance, etc. The player may then perform a subsequent action based on the detected facial expression. If the player correctly identifies the emotion represented by the facial expression (e.g., lying by suspect about whether the red wire or blue wire defuses a bomb), the player will be more likely overcome the obstacle or challenge (e.g., defusing the bomb) than if the player chooses incorrectly. In this example, if the player incorrectly believes that the suspect showed arrogance, and not lying, the player may incorrectly believe that the suspect provided no information about whether the red or blue wire should be cut to defuse the bomb. Other embodiments may portray microexpression detection in other manners, and may also use similar scenarios for education or training players in microexpression detection and interpretation.

Once versed in the various categories and manifestations of facial microexpressions, the agent (player) may be able to perceive microexpressions and interpret their meaning in a short period of time, e.g., less than 1.5 seconds. Microexpression recognition and pattern recognition may be used in challenges including examples such as: determining whether a man driving a truck used in an attack against the agent is an accomplice or an unwitting participant, e.g., by quickly asking the driver questions and determining whether he is lying, the agent learns whether to release the driver or disable him to prevent further danger to himself/herself and other persons; the agent is being recruited by a member of a spy network to perform a dangerous mission, and must urgently determine, at each stage in the conversation, whether the recruiter is lying, and whether the recruiter is genuine in his/her sentiments regarding the tragic repercussions if the mission fails; the agent is forced by a police/military/intelligence organization to act as their microexpression interpretation tool, and the organization uses this as a test to assess his capabilities, and thus determine whether the agent is the special human they seek to exploit; and the agent must determine whether his/her lover's claims of fidelity are true in the seconds before the lover is abducted by force or otherwise made unavailable.

According to some aspects of the invention the agent may be able to suppress and otherwise control his/her own microexpressions, and thus manipulate the results of a microexpression assessment of the agent by others. For example, under questioning before a high-speed video camera, the agent must convey through microexpressions that the agent knows nothing of the kidnapping of a corrupt dictator (when in fact the agent carried it out herself), and convey ignorance of the country ruled by the dictator (when in fact the agent knows it well). In another example, an agent might be required to suppress feelings of happiness when seeing an accomplice escape so as not to reveal the agent's allegiance with the accomplice.

Facial display and recognition capabilities may be simulated, or may be provided via a software interface (e.g., frame 803, FIG. 8) through which the user analyzes facial expression/emotion of another characters. For example, a player may be tasked to identify sub-challenge threat personalities by instructing the computer to perform facial comparisons against a pre-loaded cast of characters whose faces are labeled with identities and roles in the game. Alternatively, players may load photos or video clips of their own faces in the pre-game set-up. These photos or video clips may be used as icons to identify the players on the display of the computer game. Alternatively, a player may load photo(s) or video clip(s) of other personalities to act as the player's icon(s). The facial display and recognition aspect may be further employed by importing or referencing facial images from internet websites (e.g., Facebook, Myspace, etc.), to enable a player to invite another player to a game, or to increase a player's awareness of his/her opponent, and to provide greater amusement and "stakes" for players, because each may then perceive the game play as against real-life opponents rather than as against anonymous players. Alternatively, the facial recognition capability may allow a player to identify, for example, a target opponent, when initially supplied by the computer with only the face image of the opponent. In this target-identification process, the player may link to search websites (e.g., Google, Yahoo, etc.) to acquire details on a target or other individual that may be helpful in surmounting further sub-challenges or the chief challenge.

One or more challenges may require the player/agent to use ultra-high or low frequency light detection to overcome the challenge. Analogous to perception of high-frequency sounds, the agent can visualize high-ultraviolet light signals, which are visible to many types of insects, for example, but invisible to normal humans. An example of a challenge that requires the use of ultra-high frequency light detection to beat the challenge is to place the agent in a dense tropical forest and require the agent to detect a moving threat object that his hidden within the shadows of the trees. The agent's perception of high-frequency light reflected by the threat object enables the agent to locate and evade the threat. Conversely, the agent may also be able to visualize lower frequency light signals, for example in the infra-red range, enabling him/her to visualize scenes that would otherwise appear dark to normal humans. Using this enhancement, the player/agent may overcome challenges requiring, for example, navigating in the dark or engaging in combat in the dark.

The various challenges, obstacles, enhancements, and vulnerabilities described above, as well as any other hyper-fast abilities, may be performed in accordance with the game control logic 125. For example, control logic 125 may require a user to complete or overcome four randomly selected challenges on an easy difficulty level, seven randomly selected challenges on a medium difficulty level, and 10 randomly selected challenges on a hard difficulty level, in addition to a chief challenge, in order to complete the game or a round of the game. Challenges may be selected based on the enhancements and/or vulnerabilities of the player/agent. The control logic then defines which user inputs cause the agent to perform various actions and move in various directions, and the control logic causes the agent to perform according to the user input in an attempt to overcome each challenge.

Figure 6:
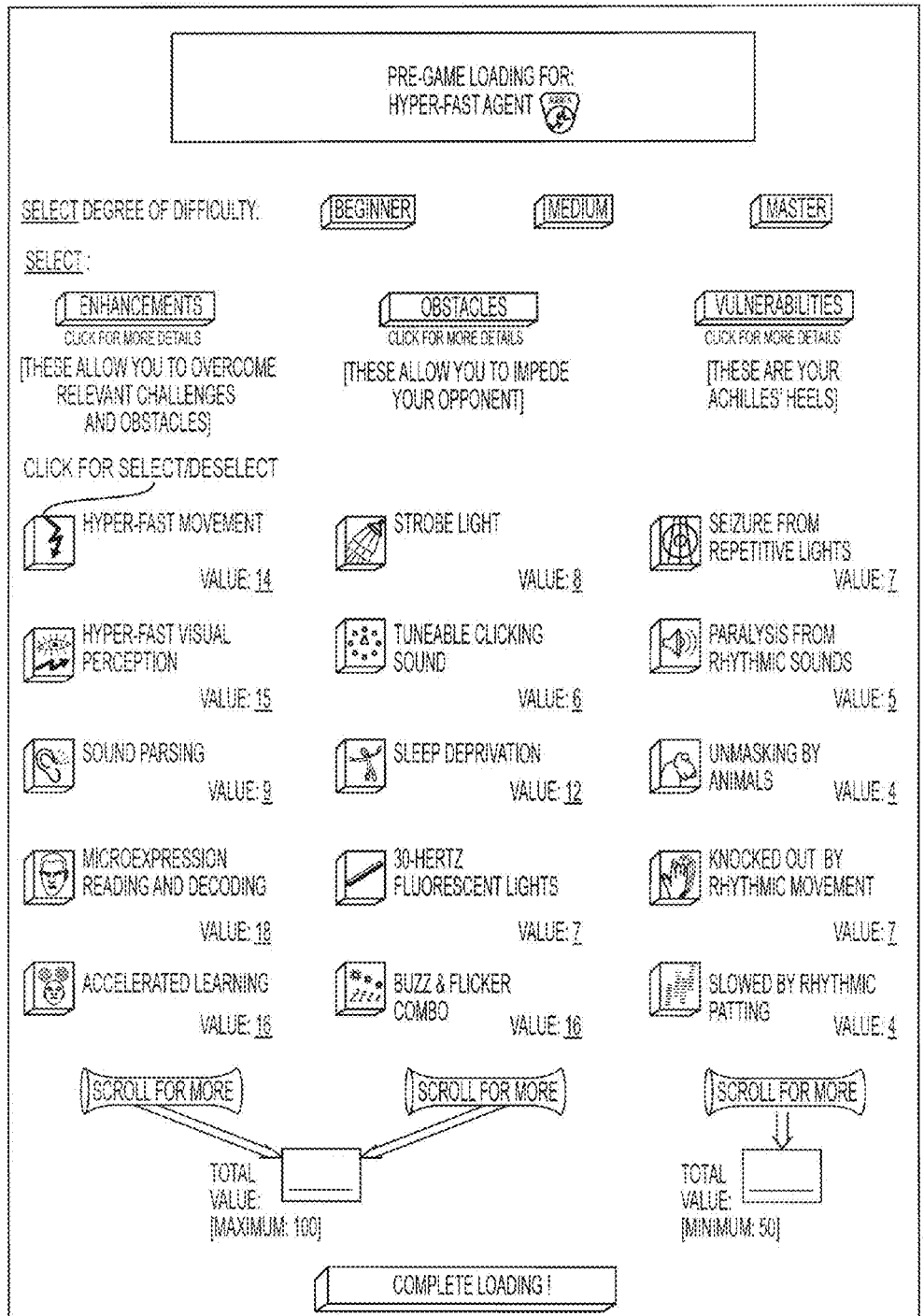
FIGS. 6-8 illustrate sample screenshots according to one or more illustrative aspects described herein.
Figure 7:
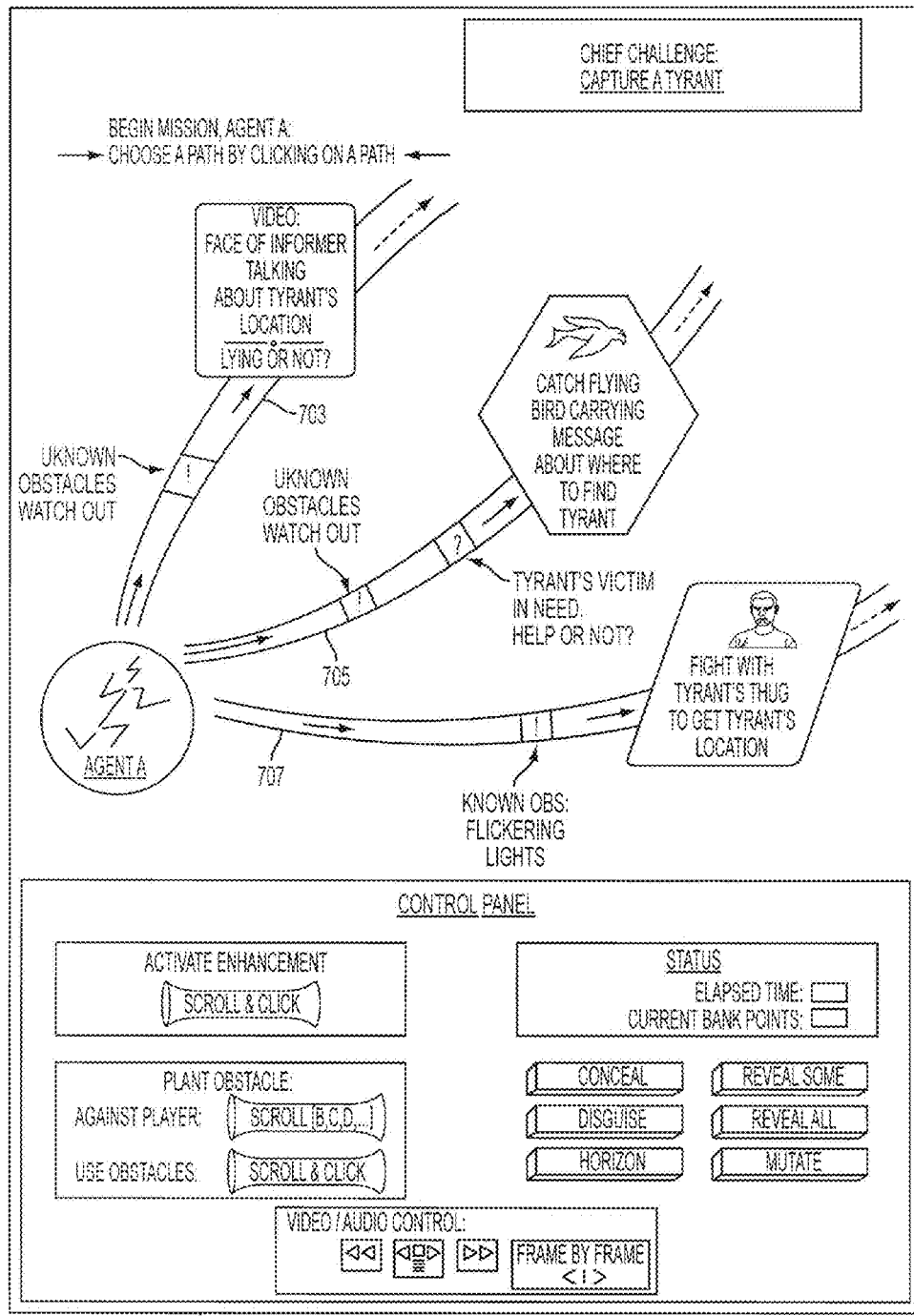
Figure 8:
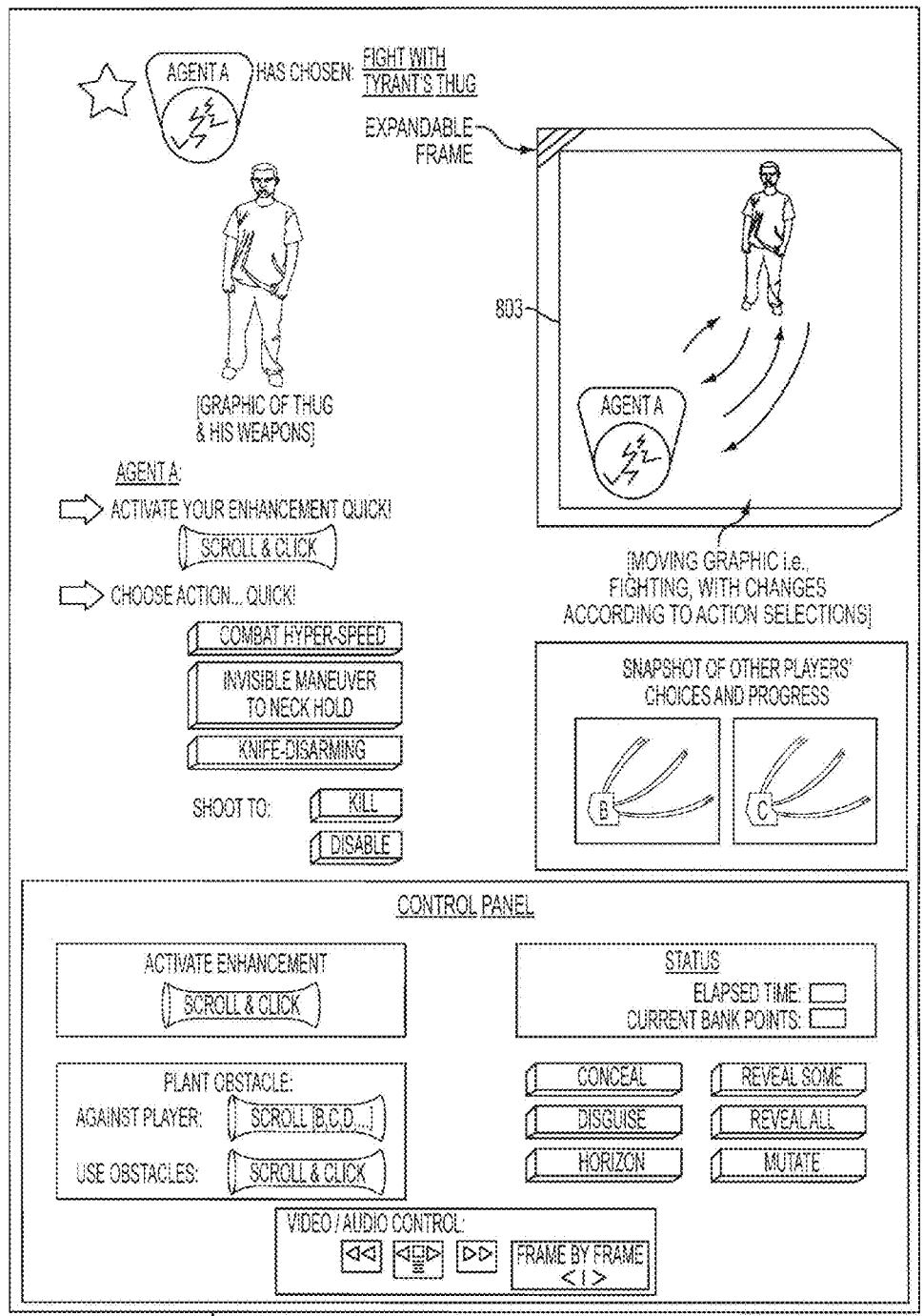

FIGS. 6-8 illustrate various sample screenshots usable with one or more video game embodiments described herein. The screenshots are illustrative only. Variations and modifications may be made without departing from the aspects of the invention described herein. FIG. 6 illustrates a sample pre-game loading screen 601 through which a user can select a degree of difficulty, one or more enhancements, one or more vulnerabilities, and one or more obstacles. As shown in screen 601, lists of available enhancements, vulnerabilities, and obstacles are illustrated in their respective columns, along with a point value associated with each. The total point values are summed so that the player can determine how many of each he or she has accumulated. In the example illustrated in FIG. 6, the player has 100 points to "spend" on enhancements (for himself) and obstacles (to use against other players), and a separate allotment of points that must be spent on vulnerabilities (here, the player's vulnerabilities must total at least 50 points). Other point totals and values may be used, based on the weighting between enhancements, vulnerabilities, and obstacles. When the player is happy with his/her portfolio, the player selects "Complete Loading" button to continue.

FIG. 7 illustrates a sample mission overview screen, through which a user can select from multiple paths 703, 705, 707. The user is presented with some basic information about the obstacles and/or challenges associated with each path, so that the user can decide which path to take, based on strategy, likes/dislikes, or based on some other criteria. Screen 701 also depicts a sample control panel through which the user can select and activate an available enhancement, select and plant an available obstacle (e.g., against another player or computer controlled characters), and use an auxiliary ability (e.g., conceal, disguise, horizon, reveal all, reveal some, mutate, etc.). Video controls may also be provided, as well as elapsed time, time remaining, score, and/or points available to be spent on new enhancements, vulnerabilities, and/or obstacles as described herein.

According to an illustrative aspect, the video controls may be used to analyze video in detail, e.g., in slow motion or in zoomed-in detail to simulate the hyper-fast abilities of the agent. A player may play the video forward or backward, at normal or fast speeds, and can do so frame-by-frame. In this way the player can identify an important clue or other feature that appears for a short time, perhaps in only one, or a few, video frames that would not otherwise be visible at normal speeds. For example, the name of a hotel in a certain city might appear on a paper briefly visible in the hands of a terrorist before he crumples the paper and swallows it. In another example, a player may identify a useful license plate number that otherwise might appear as a blur. In still another example, the face flicker of a certain interviewee may indicate he is lying, and the player may be required to examine the video in slow motion to detect the tell-tale face flicker. In yet another example, a high-speed video might reveal, on close inspection by the player, that a threat character in a sub-challenge display has, through sleight-of-hand, swapped one critical document for another.

The video review options available to the player may include zoom-in and zoom-out capabilities, so the visual frame can show, for example, part of an image in more detail. The embedded video can also display video from a high-speed video camera that can record actions so fast that they are not visible to the naked human eye but which are visible to hyper-fast agent. Such videos can be shot using a commercially available high-speed camera (e.g., certain commercially available cameras can record at more than 9,000 frames per second), or rendered graphically using animation and/or computer graphic rendering software.

FIG. 8 illustrates a sample game-play screen 801, through which the user sees more detail regarding current obstacles and challenges, and also can see other users' progress based on those users' independent choices. Frame 803 might present video content on which the player must base his or her decisions, e.g., detection of facial expressions, watching videos in fast forward to learn an important piece of information, etc. The video may be controlled using the control panel's video controls. Screen 801 may change as the player traverses the route or course of the game in a race against other players simultaneously attempting to overcome their own challenges and obstacles until a winner is determined.

Frame 803 (or another portion of screen 801 or a different screen) may include a display through which the user can interact with a mapping or satellite image database (e.g. Google Maps, Google Earth, Google Street Views, MapQuest, Microsoft Live Search Maps, Microsoft Virtual Earth, etc.) in order, for example, to follow clues, chase targets, escape threats, or determine pathways in which to pursue adversaries or other targets. The mapping/topology function may also appear to the player in video/moving image format, and may be equipped with zoom-in, zoom-out functions.

As defined by the control logic 125, game play is not limited to that shown in FIG. 6, FIG. 7, and/or FIG. 8, but rather may incorporate any of a variety of styles of game modes, including but not limited to, first-person shooter, third-person shooter (aka, follow shooter), role-playing, strategy, puzzle, arcade scroller, etc. Different game play modes may be used based on the device on which the game is being played. For example, on devices with less resources (e.g., netbooks, mobile phones, Nintendo DS®, etc. —typically have a slower processor and/or no graphics processor, less RAM, smaller nonvolatile memory, etc., than traditional desktop/laptop computers), an arcade scroller mode may be used, whereas on devices with more resources (e.g., desktop computers and game consoles), a first person shooter mode may be used. In addition, the frames per second and resolution per frame may be adjusted based on the resources of each device.

Hyper-fast abilities may further be incorporated into games and simulations including virtual reality and virtual worlds, e.g. "Second Life" and other simulated environments. For example, upon activating a hyper-fast mode in a virtual world, an agent may be able to move very quickly within the virtual world. In one embodiment, for each movement input provided by the user, the character may move one-hundred times (100×) the normal amount the character would otherwise move within the virtual reality or virtual world when the hyper-fast mode is not activated.

Figure 4:
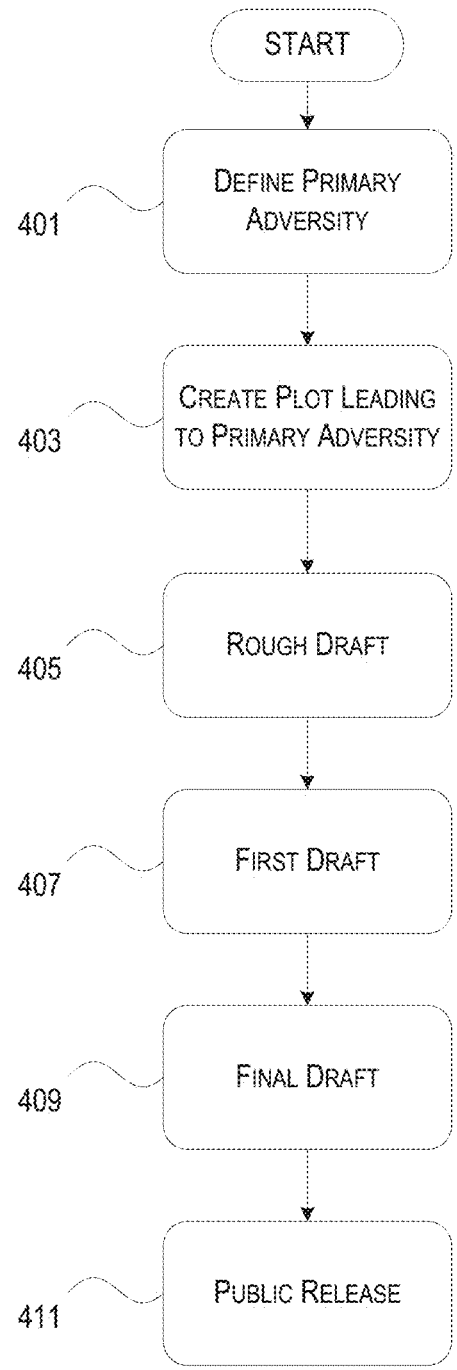
FIG. 4 illustrates a method of distributing an entertainment product according to one or more illustrative aspects of the invention.
Figure 5:
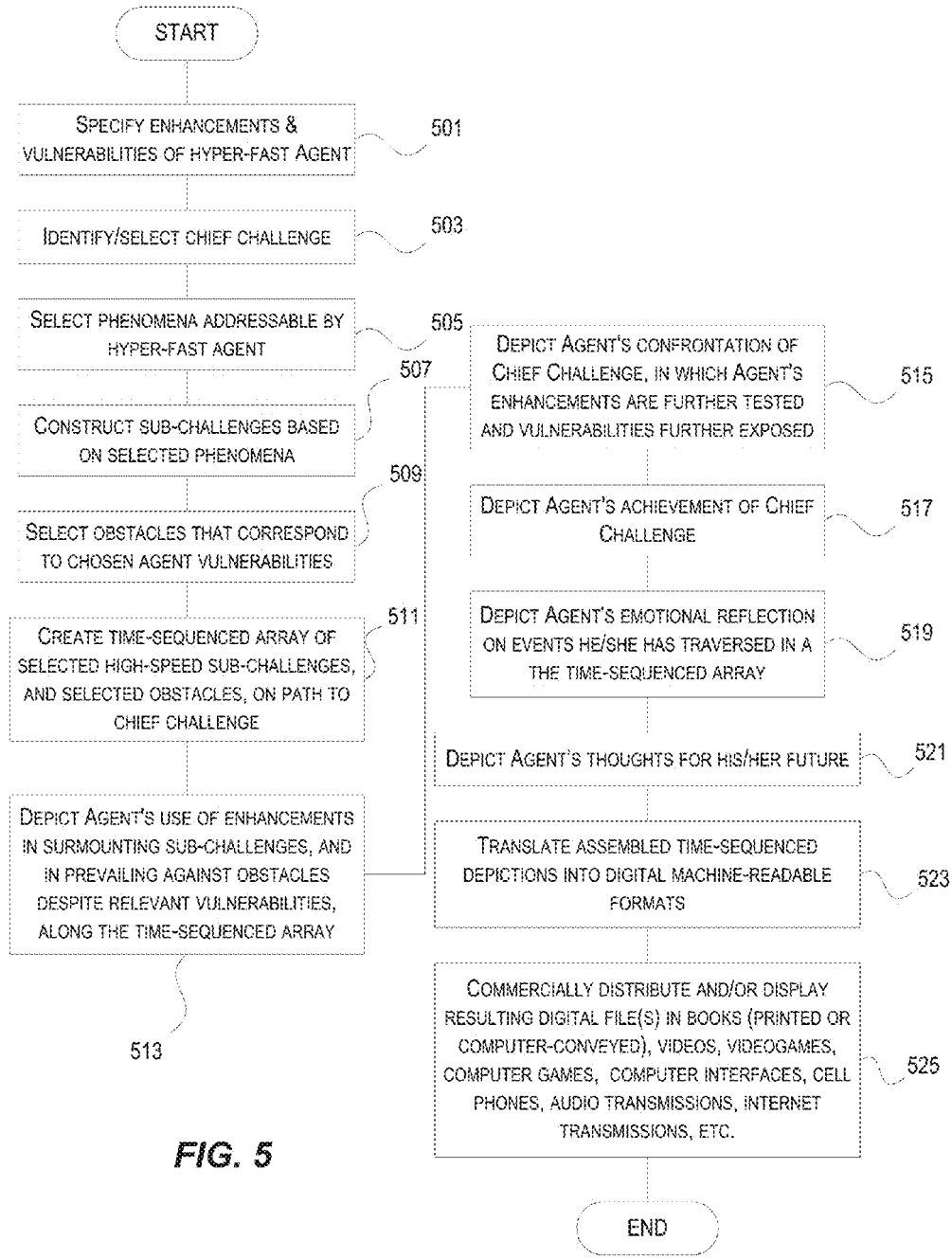
FIG. 5 illustrates a method of plot development and distributing of an entertainment product according to one or more illustrative aspects of the invention.

With reference to FIG. 4, an agent having hyper-fast abilities may be incorporated into other entertainment media in addition to computer games, e.g., into digital media using the methods of FIG. 4 and/or FIG. 5. In step 401, a primary adversity plot point is identified or generated, e.g., a principal objective or idea to be taught or explained in the entertainment media. Specific adversities and challenges are defined that the agent must encounter and/or overcome throughout the plot to achieve the defined principal objective or idea. This information may be stored in software or in a database, e.g., in scriptwriting software when the entertainment media will be a movie or TV show, or in authoring software when the entertainment media will be a novel. Other types of storage may be used as well. In step 403, a plot centered around an agent having hyper-fast abilities is generated. The plot may be for any variety of media, e.g., books, movies, television shows, miniseries, etc., and the plot may be for a single volume, film, or show, or arc across multiple volumes, movies, shows, seasons, etc. The generated plot may include the specific adversities and challenges, and/or other adversities, challenges, obstacles, etc., as described herein. Again, the plot may be stored in software or in a database, e.g., in scriptwriting software, authoring software, etc. In step 405 a rough draft of the media is generated, written, or produced, based on the plot and defined adversities, and saved in tangible form, e.g., in computer memory, on paper, optical storage, online storage (wiki, document sharing, etc.), and the like. The draft may be in the form of an outline, script, storyboard, or other preliminary presentation of the plot, incorporating the adversity points. In step 407 a first draft of the media is written (e.g., a book), generated (e.g., computer animation), and/or produced (e.g., video media), based on the rough draft, and stored in tangible form. The first draft may be stored in software or in a database, as above, and may incorporate audiovisual content as well as literary content, as appropriate. In step 409 the first draft is edited to obtain a final draft, which is also saved in tangible form, and in step 411 the final draft is made available to the consuming public, e.g., by sale, rent, lease, display, performance, etc.

Using the method of FIG. 4, many forms of media may be produced and made available to the public. Books may be written incorporating challenges, sub-challenges, chief-challenges, enhancements, vulnerabilities, obstacles, and/or other plot points described above and sold to consumers for literary entertainment. The books may include more than just novels, e.g., and may also include Madlibs® or "choose your own adventure" type books (as well as ebooks, text readable books on Kindle™, Sony ereaders, Google Books, cell phones, flexible/rollout electronic ink displays, etc.) to provide dynamic entertainment or education/training to the reader/consumer. Another form of entertainment media may include movies, television shows, internet videos, and other video products, whereby actors and/or animators, act out scenes incorporating one or more plot point discussed herein. Internet videos may further be combined with computer game and "choose your own adventure" style interactive media to allow a user to choose a scene sequence, alternative endings, etc. Aspects described herein may further include sending text messages (e.g., SMS) or multimedia messages (e.g., MMS) to mobile devices to deliver textual content or other media.

FIG. 5 illustrates a more detailed method of plot development and media distribution according to another embodiment of the invention. As with the method of FIG. 4, the media developed using the method of FIG. 4 may be stored throughout the process in appropriate authoring software or content storage systems, including digital media players, computers, and the like. Initially, in step 501, an author or authors may specify one or more enhancements and vulnerabilities of a hyper-fast agent. Enhancements and vulnerabilities may be selected to be complementary to each other as described herein, or they might be selected randomly or having little relevance to each other, or they may be selected based on preferred themes, or based on other criteria. Preferably, each enhancement and vulnerability is selected for subsequent use during the plot.

In step 503 the author(s) select or identify a chief challenge that the hyper-fast agent must overcome to successfully complete his or her mission or goals. The chief challenge may be any of the variety described herein and above, or may be a different chief challenge suited to the media in which the plot is presented to readers, viewers, etc.

In step 505, based on the selected enhancements, vulnerabilities, and chief challenge, the plot is made to include one or more high-speed phenomena addressable by the hyper-fast agent. The high speed phenomena may be used as the basis for selecting or identifying actions or feats that the hyper fast agent can perform based on his or her enhancements. In step 507 the plot is made to include a series of sub-challenges that use or are based on the high-speed phenomena, e.g., that the agent must use one or more of his or her enhancements in order to overcome each sub-challenge.

In step 509 the plot is made to include one or more obstacles that each exploit one or more vulnerabilities of the hyper-fast agent. Each obstacle may be the same or different, or include different levels of difficulty while exploiting the same or different vulnerabilities. In step 511 the plot is arranged into a time-sequenced array of the selected high-speed phenomena sub-challenges and selected obstacles on a path to the chief challenge.

In step 513 the author(s) depict the agent's use of his or her enhancements in surmounting the sub-challenges, and in prevailing against obstacles despite relevant vulnerabilities, along the time-sequenced array. In step 515 the plot is brought to a climax by depicting the agent's confrontation of the chief challenge, in which the Agent's enhancements are further tested and vulnerabilities further exposed, resulting in the depiction of the agent overcoming the chief challenge in step 517. After beating the chief challenge, the plot in step 519 may optionally also depict the agent's emotional reflection on events he/she has traversed in the time-sequenced array leading up to and including confronting the chief challenge. The plot may further depict in step 521 the agent reflecting on his or her future, contemplating future chapters in his or her life, and thereby weave into the plot a seed or foreshadowing of a sequel.

In step 523 the author(s) may translate the assembled time-sequenced depictions into digital machine-readable formats, e.g., as a computer game, digital film, text and/or graphic novel, television show, e-book, cell phone readable text, audio file, etc. In step 525 the author(s) may commercially distribute and/or display the resulting digital file(s) in books (printed or computer-conveyed), videos, videogames, computer games, computer interfaces, cell phones, audio transmissions, internet transmissions, videos, movies, etc.

One or more video game or video aspects described herein may include a video widget or widget-like technique or control through which an audience of the video game or entertainment media may participate in an online video or computer game. For example, users may embed interactive commentary and/or links into videos. A user may annotate a video by selecting a time location in the video, and providing an annotation that corresponding to that time stamp within the video. A user may optionally also select or provide screen coordinates for where in the image being displayed at the selected time the annotation should be displayed or to which it otherwise corresponds. For example, if a user opts to provide an annotation for the video frame at one minute and thirty-two seconds, the user might also indicate screen coordinates of X, Y to specify an object in the frame to which the annotation corresponds. The user may further specify a time range when the annotation is applicable to a longer duration than a single point in time. The user may also specify a range of screen coordinates or otherwise define a screen area identifying the object or location on the screen to which the annotation corresponds.

Alternatively, users may select from multiple links embedded in a video to help decide what happens next in the video, e.g., by selecting or voting on a choice a character makes, selecting or voting on multiple endings, etc. Based on the user selection, the video may skip in time to a certain position in the video, or may begin playback of a second separate video based on the selection made by the user(s).

Although the subject matter has been described in language specific to structural features and/or methodological acts, it is to be understood that the subject matter defined in the appended claims is not necessarily limited to the specific features or acts described above. Rather, the specific features, acts, enhancements, vulnerabilities, and challenges described above are disclosed as example forms of implementing the claims.

What is claimed is:

1. One or more non-transitory computer readable media storing computer readable instructions that, when executed, cause a computer system to:
   receive a first plurality of user inputs, each user input of the first plurality of user inputs identifying a different enhancement that defines one of a plurality of simulated hyper-fast abilities of a first player-controlled human character in a virtual environment of a video game, wherein the first plurality of user inputs identify a plurality of enhancements selected based on a first predetermined allotment of points usable to obtain enhancements, and wherein a player controlling the first player-controlled human character in the virtual environment interacts with the virtual environment using a game controller;
   receive second user input different from the first plurality of user inputs, wherein the second user input identifies one or more vulnerabilities of the first player-controlled human character selected based on a second predetermined allotment of points usable to obtain vulnerabilities, wherein the one or more vulnerabilities of the first player-controlled human character are not tied to any of the plurality of enhancements, and wherein the second predetermined allotment of points is independent of the first predetermined allotment of points and is unaffected by the first plurality of user inputs;
   determine a plurality of challenges for the player controlling the first player-controlled human character in the virtual environment by selecting challenges from a database of challenges based on the plurality of enhancements and the one or more vulnerabilities of the first player-controlled human character, wherein the plurality of challenges comprises a chief challenge and one or more sub-challenges;
   determine an order for the sub-challenges to create a game course;
   graphically render the virtual environment for output to a display device;
   present a first challenge of the plurality of challenges within the virtual environment;
   receive, via the game controller, third user input indicating a particular hyper-fast ability to be performed by the first player-controlled human character in the virtual environment;
   determine, based on the third user input indicating the particular hyper-fast ability to be performed by the first player-controlled human character in the virtual environment, whether the first player-controlled human character overcomes the first challenge of the plurality of challenges;
   based on determining that the first player-controlled human character overcomes the first challenge of the plurality of challenges, graphically render, to the display device, graphics depicting a success of the first player-controlled human character in overcoming the first challenge of the plurality of challenges; and
   based on determining that the first player-controlled human character does not overcome the first challenge of the plurality of challenges, graphically render, to the display device, graphics depicting a failure of the first player-controlled human character in overcoming the first challenge of the plurality of challenges.

2. The one or more non-transitory computer readable media of claim 1, having additional instructions that, when executed, cause the computer system to determine the order for the sub-challenges by randomly ordering the sub-challenges.

3. The one or more non-transitory computer readable media of claim 1, having additional instructions that, when executed, cause the computer system to initiate a hyper-fast ability mode corresponding to the third user input indicating the particular hyper-fast ability to be performed by the first player-controlled human character in the virtual environment,
   wherein determining whether the first player-controlled human character overcomes the first challenge of the plurality of challenges is further based on fourth user input received via the game controller while in the hyper-fast ability mode, wherein the fourth user input causes the first player-controlled human character to interact in real time with the first challenge of the plurality of challenges.

4. The one or more non-transitory computer readable media of claim 1, having additional instructions that, when executed, cause the computer system to:
   select an obstacle from a plurality of available obstacles;
   determine a game location at which to place the obstacle; and compare a characteristic of the obstacle selected from the plurality of available obstacles to the one or more vulnerabilities of the first player-controlled human character to determine an impact of the obstacle selected from the plurality of available obstacles on the first player-controlled human character.

5. The one or more non-transitory computer readable media of claim 4, wherein selecting the obstacle from the plurality of available obstacles comprises selecting the obstacle based on the one or more vulnerabilities of the first player-controlled human character.

6. The one or more non-transitory computer readable media of claim 4, having additional instructions that, when executed, cause the computer system to receive input from a second player of the video game selecting the obstacle selected from the plurality of available obstacles.

7. The one or more non-transitory computer readable media of claim 1, having additional instructions that, when executed, cause the computer system to simulate a hyper-fast brain processing ability of the first player-controlled human character in the virtual environment of the video game.

8. The one or more non-transitory computer readable media of claim 1, having additional instructions that, when executed, cause the computer system to simulate a hyper-fast neurological ability of the first player-controlled human character in the virtual environment of the video game.

9. The one or more non-transitory computer readable media of claim 1, having additional instructions that, when executed, cause the computer system to simulate a hyper-fast neuromuscular ability of the first player-controlled human character in the virtual environment of the video game.

10. The one or more non-transitory computer readable media of claim 1, having additional instructions that, when executed, cause the computer system to:
graphically render a genetic mutation in the first player-controlled human character by displaying a morph event on the display device in which the first player-controlled human character morphs from a normal state to a genetically altered state;
prior to displaying the morph event, disable one or more hyper-fast abilities of the first player-controlled human character; and
subsequent to displaying the morph event, enable the one or more hyper-fast abilities of the first player-controlled human character.

11. The one or more non-transitory computer readable media of claim 1, having additional instructions that, when executed, cause the computer system to:
randomly generate a decoy challenge not solvable by the first player-controlled human character; and
receive user input for the first player-controlled human character to attempt to solve the decoy challenge; and
graphically render, for display on a screen associated with a second player-controlled human character, one of an enhancement and a vulnerability of the first player-controlled human character based on the user input received for the first player-controlled human character.

12. The one or more non-transitory computer readable media of claim 1, having additional instructions that, when executed, cause the computer system to:
receive user input from the player controlling the first player-controlled human character to depict the first player-controlled human character to appear as a different, randomly-selected character for a predetermined period of time; and
graphically render the first player-controlled human character as the different, randomly-selected character for the predetermined period of time.

13. The one or more non-transitory computer readable media of claim 1, having additional instructions that, when executed, cause the computer system to:
receive user input from the player controlling the first player-controlled human character to display a list of upcoming, predetermined challenges; and
display the list of the upcoming, predetermined challenges on the display device in a manner observable to the player controlling the first player-controlled human character.

14. The one or more non-transitory computer readable media of claim 1, having additional instructions that, when executed, cause the computer system to:
depict in the virtual environment of the video game a second character displaying a microexpression, observable to the player controlling the first player-controlled human character, that suggests the second character's honesty or dishonesty;
prompt the player controlling the first player-controlled human character to input a choice from multiple possible answers as to whether the second character was truthful, based on the microexpression of the second character;
compare user input received in response to prompting the player controlling the first player-controlled human character to input the choice to a known correct answer; and
output information to the player controlling the first player-controlled human character based on whether the user input received in response to prompting the player controlling the first player-controlled human character to input the choice was correct or incorrect.

15. The one or more non-transitory computer readable media of claim 14, having additional instructions that, when executed, cause the computer system to:
receive user input asking the second character a question;
responsive to receiving the user input asking the second character the question, display the question to a user associated with the second character;
prompt the user associated with the second character to input a choice from multiple possible answers, one of which is known to the user associated with the second character as the correct answer;
compare user input received from the user associated with the second character in response to the question with a known correct answer; and
depict in the virtual environment of the video game the second character displaying the microexpression, observable to the player controlling the first player-controlled human character, that corresponds to the honesty or dishonesty of the user associated with the second character.

16. The one or more non-transitory computer readable media of claim 1, having additional instructions that, when executed, cause the computer system to:
depict in the virtual environment of the video game a necessity for the player controlling the first player-controlled human character to impersonate the voice of another character;
prompt the player controlling the first player-controlled human character to impersonate the voice of the other character through a combination of inputs;
compare user input received in response to prompting the player controlling the first player-controlled human character to impersonate the voice of the other character to a known combination required for proper voice impersonation; and output information to the player controlling the first player-controlled human character based on whether the user input received in response to prompting the player controlling the first player-controlled human character to impersonate the voice of the other character was correct or incorrect.

17. The one or more non-transitory computer readable media of claim 1, having additional instructions that, when executed, cause the computer system to simulate character vulnerabilities including distraction by rhythmic stimuli.

18. The one or more non-transitory computer readable media of claim 1, having additional instructions that, when executed, cause the computer system to simulate character vulnerabilities including detecting flickering lights that otherwise go undetected by normal human characters.

19. The one or more non-transitory computer readable media of claim 1, having additional instructions that, when executed, cause the computer system to simulate character vulnerabilities including paranoia of shortened life span.

\* \* \* \* \*